June 6, 1950  F. Z. FOUSE  2,510,568
CONTAINER SEALING METHOD AND APPARATUS THEREFOR,
INCLUDING ROTARY SEALING HEAD, ROTARY
HEAD SPACER, AND CONVEYER MECHANISM
Filed Oct. 11, 1944  19 Sheets-Sheet 1

INVENTOR.
Frederick Z. Fouse
BY
Norman T. Holland
ATTORNEY

June 6, 1950
F. Z. FOUSE
2,510,568
CONTAINER SEALING METHOD AND APPARATUS THEREFOR,
INCLUDING ROTARY SEALING HEAD, ROTARY
HEAD SPACER, AND CONVEYER MECHANISM
Filed Oct. 11, 1944
19 Sheets-Sheet 2
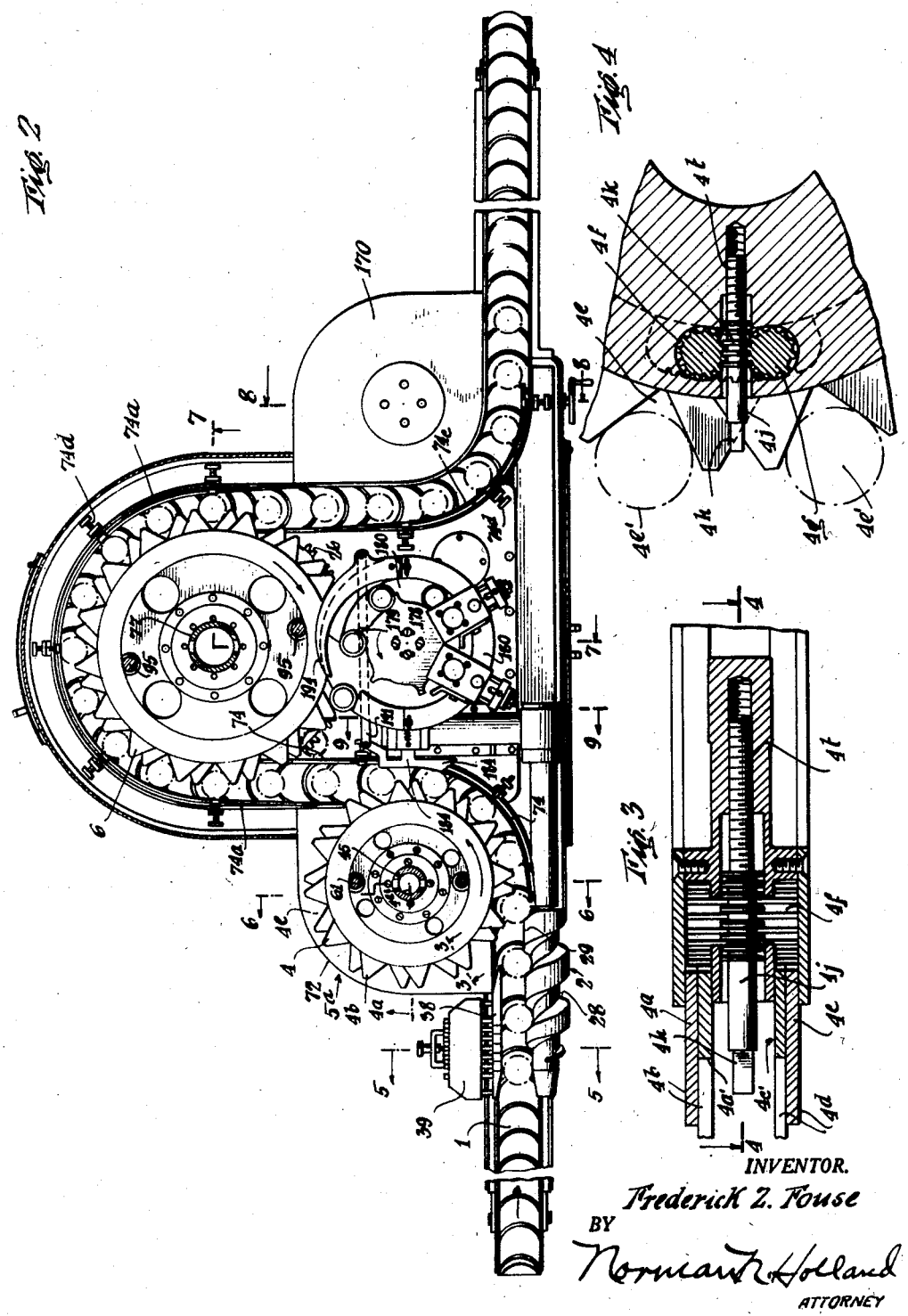
INVENTOR.
Frederick Z. Fouse
BY
Norman R. Holland
ATTORNEY

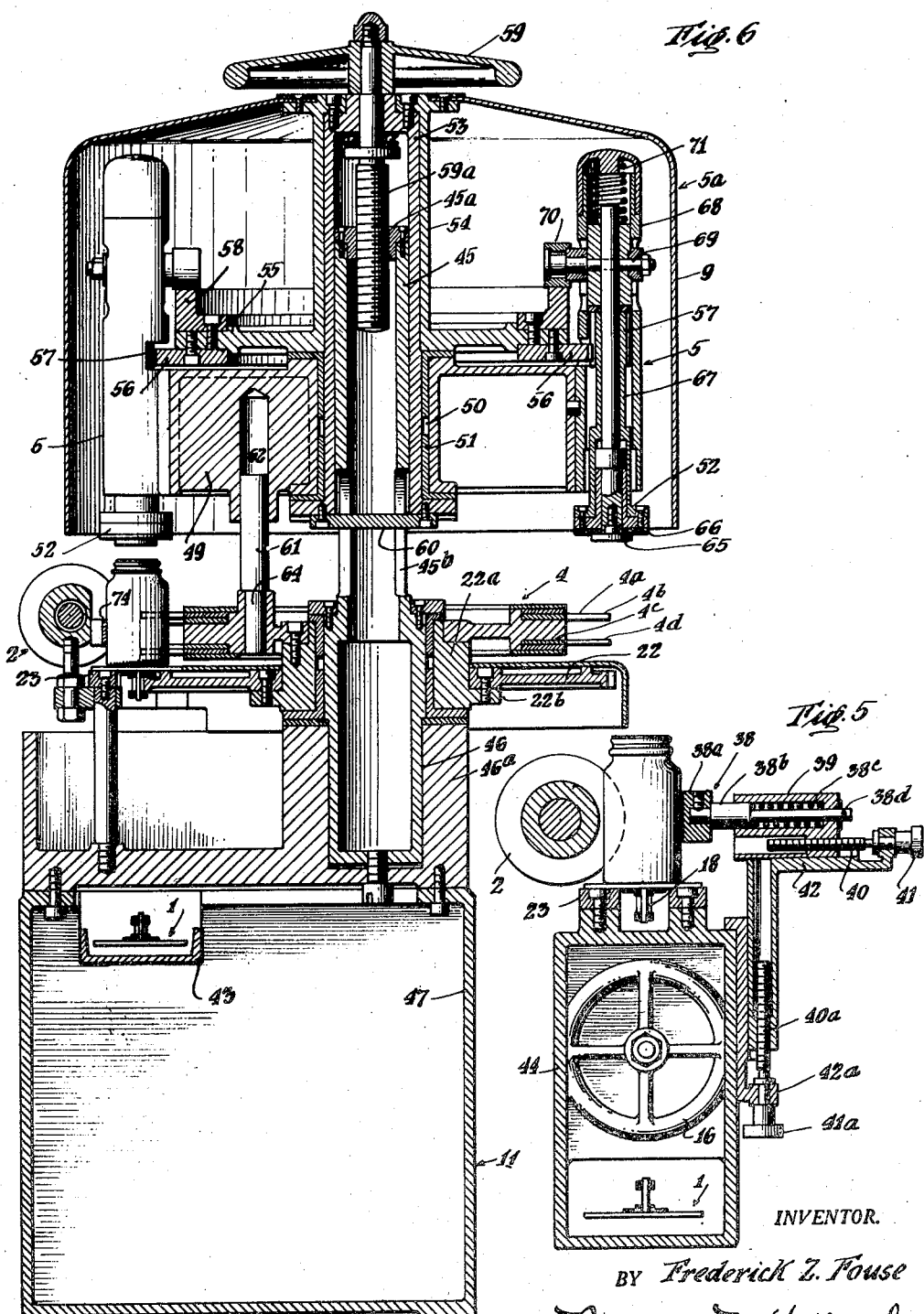

June 6, 1950  F. Z. FOUSE  2,510,568
CONTAINER SEALING METHOD AND APPARATUS THEREFOR,
INCLUDING ROTARY SEALING HEAD, ROTARY
HEAD SPACER, AND CONVEYER MECHANISM
Filed Oct. 11, 1944  19 Sheets—Sheet 5

INVENTOR.
Frederick Z. Fouse
BY
Norman L. Holland
ATTORNEY

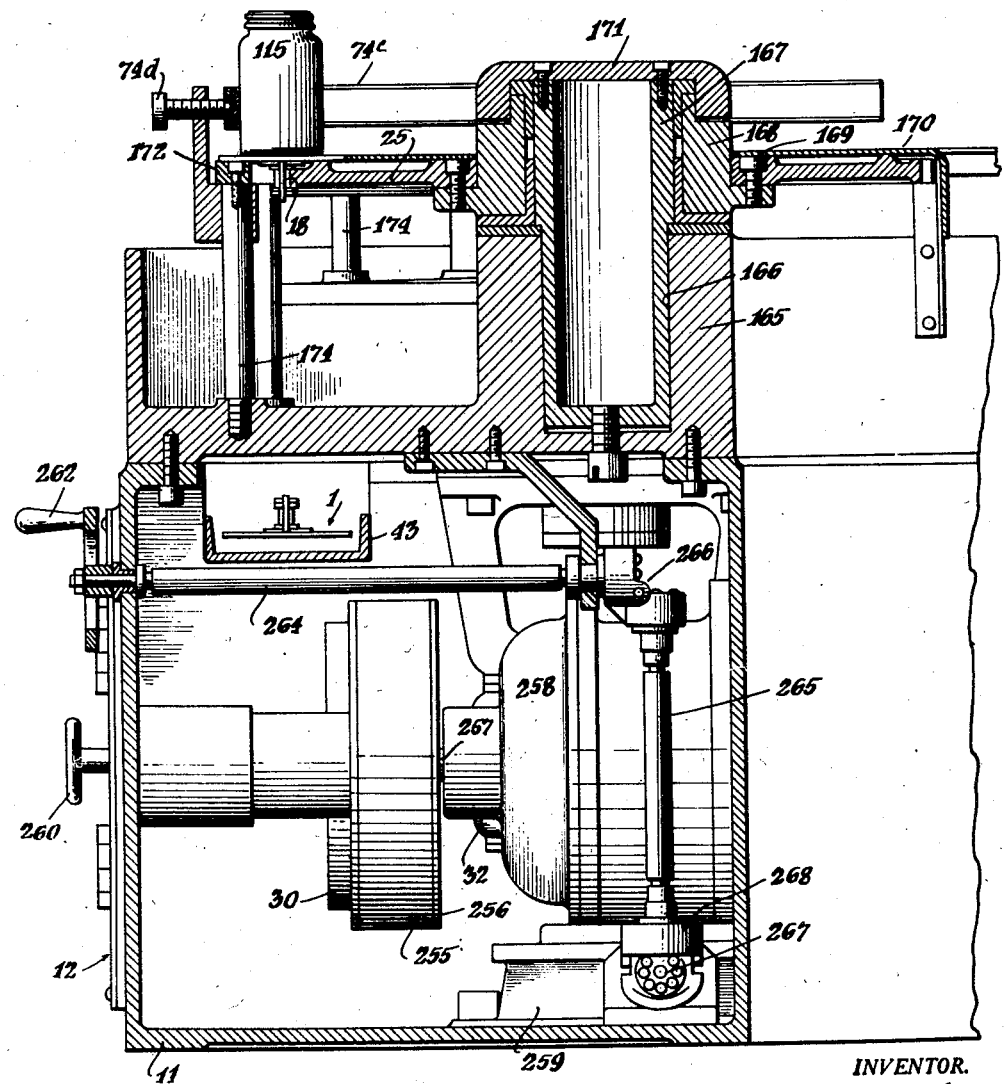

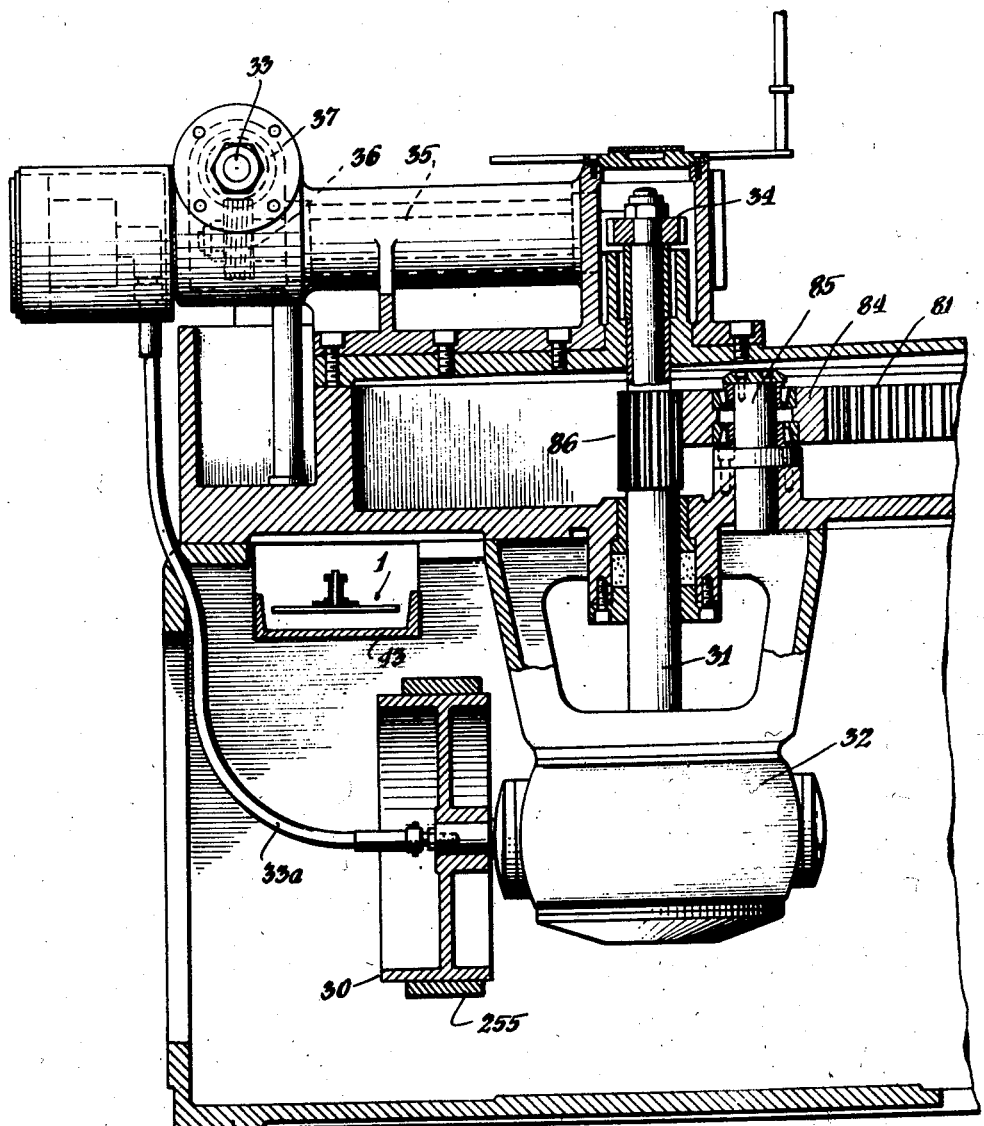

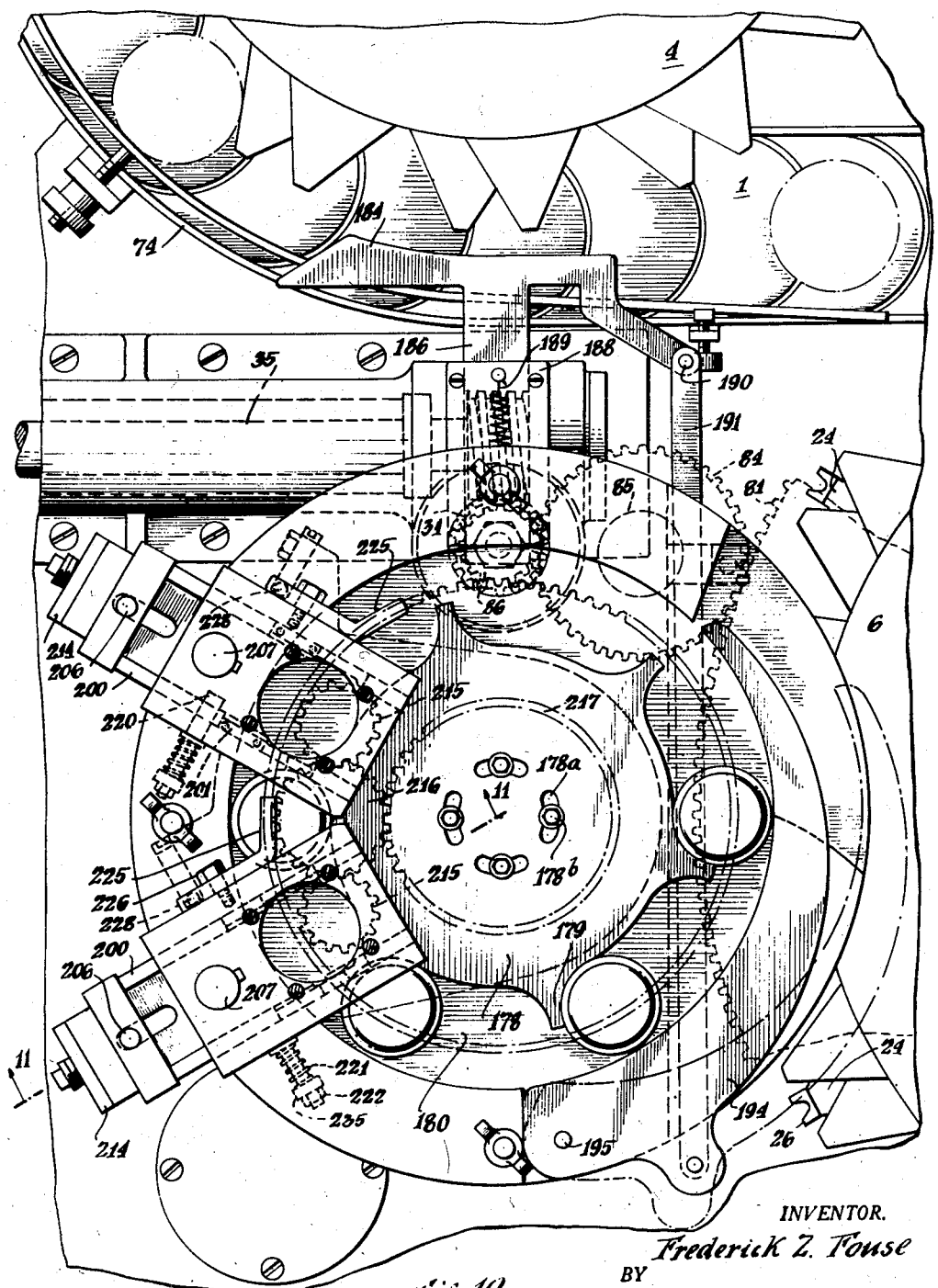

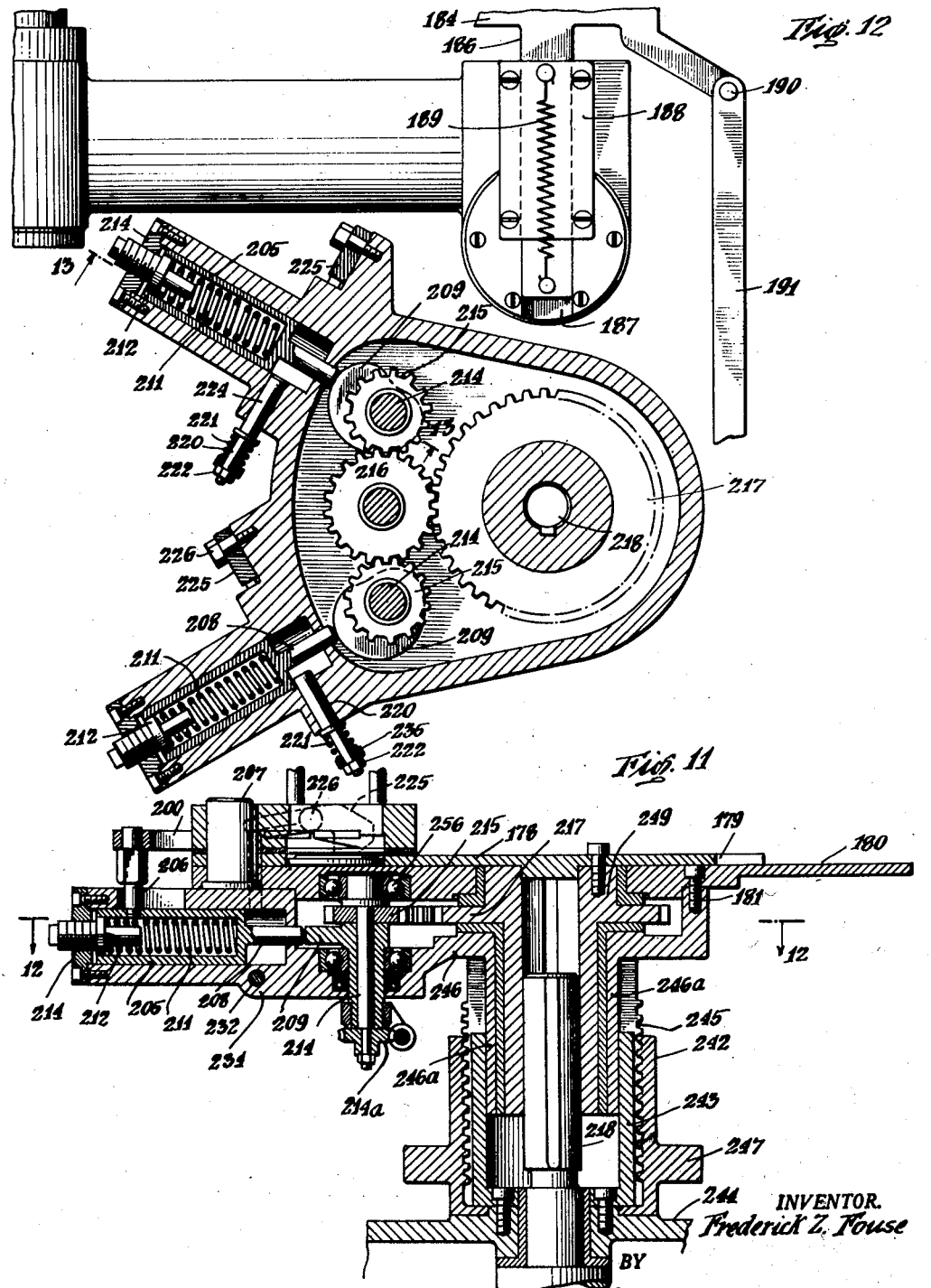

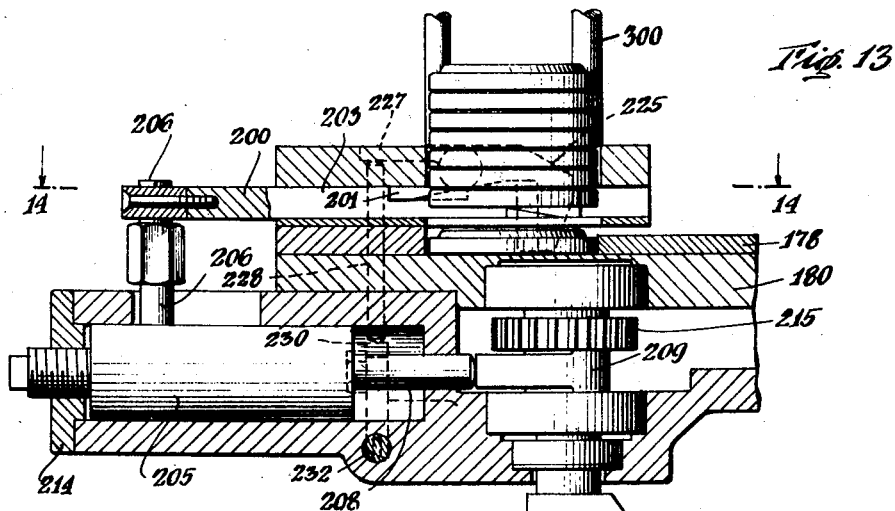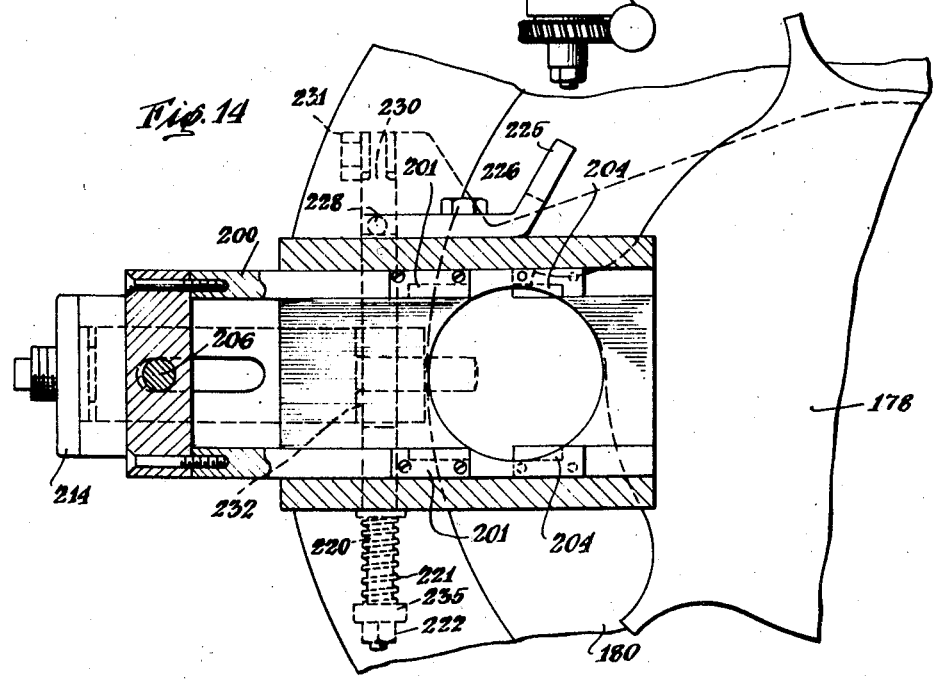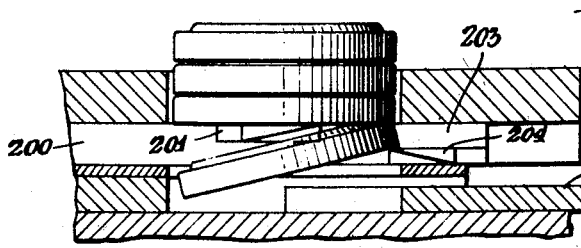

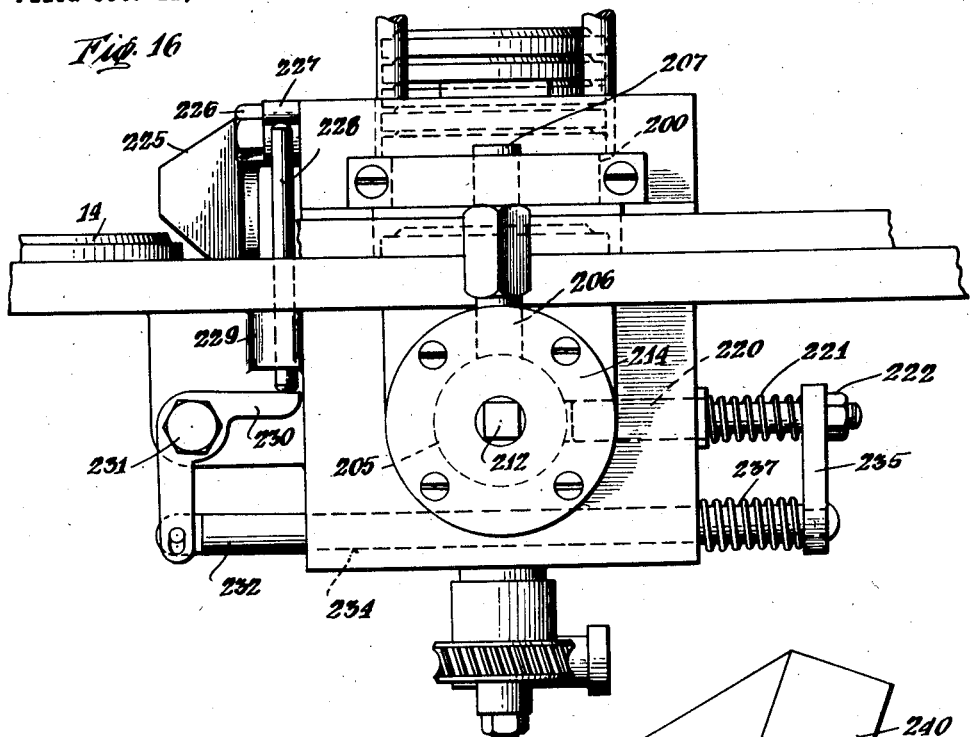
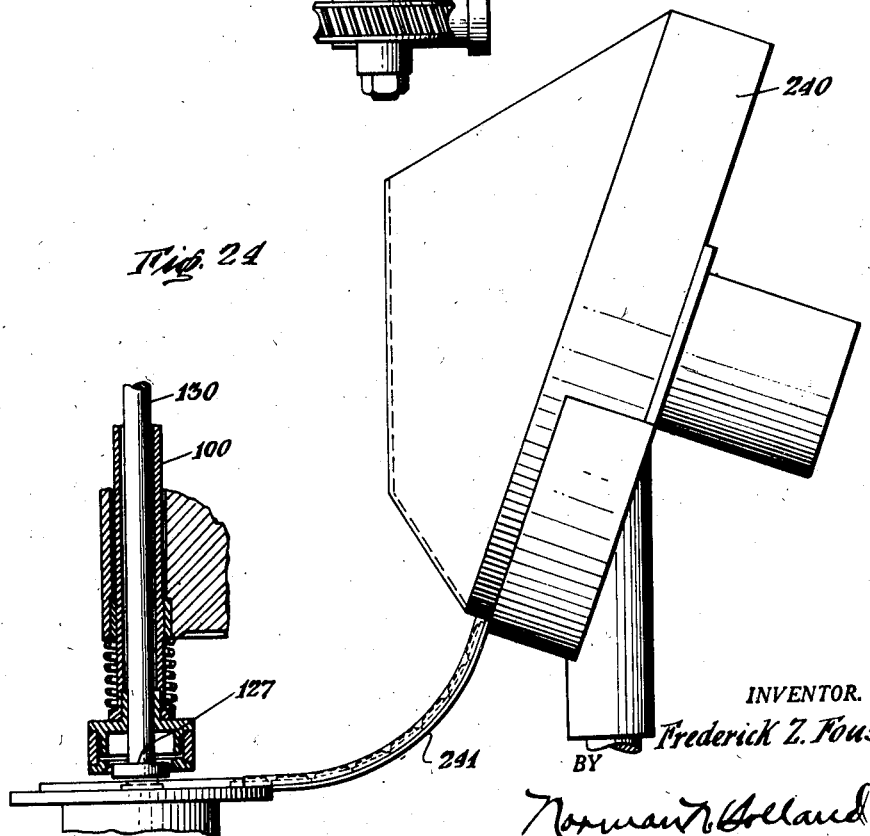

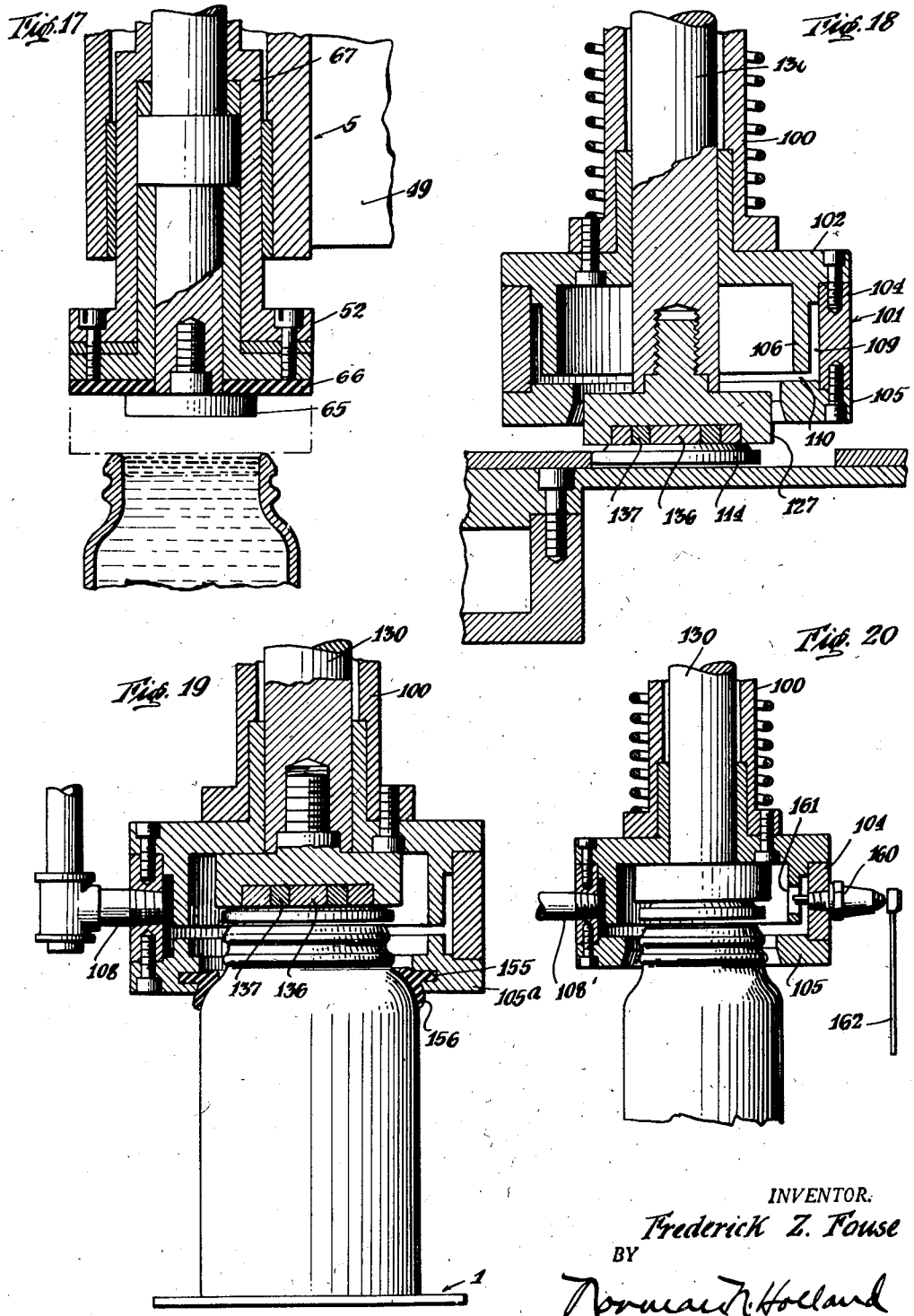

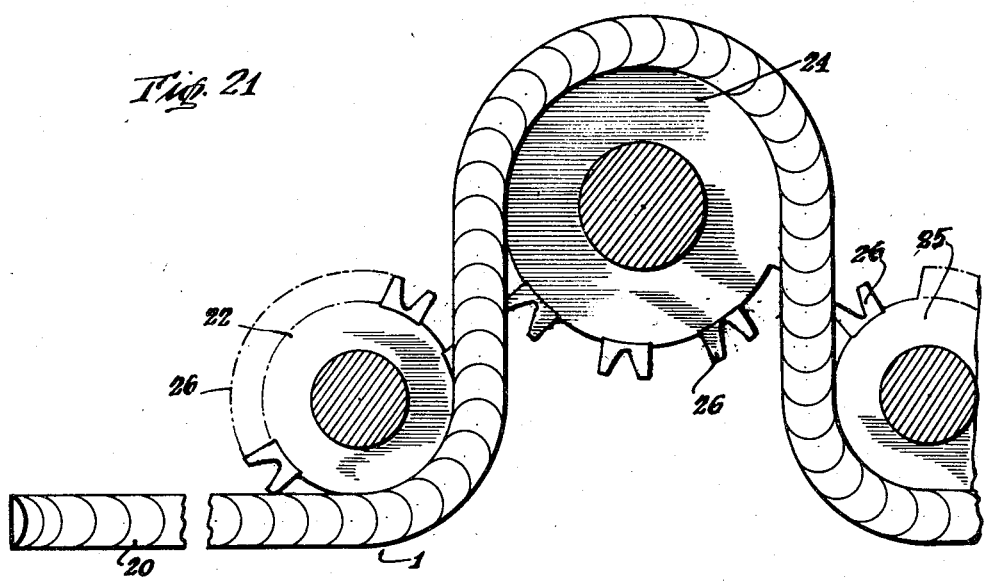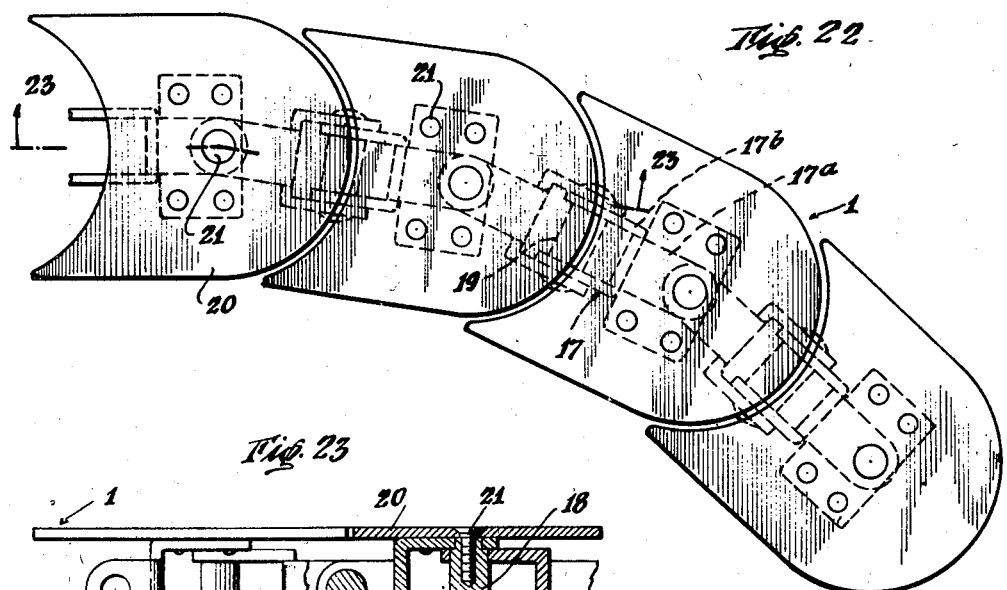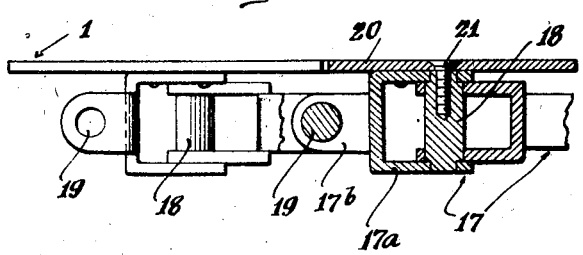

June 6, 1950     F. Z. FOUSE     2,510,568
CONTAINER SEALING METHOD AND APPARATUS THEREFOR,
INCLUDING ROTARY SEALING HEAD, ROTARY
HEAD SPACER, AND CONVEYER MECHANISM
Filed Oct. 11, 1944     19 Sheets-Sheet 14

INVENTOR.
Frederick Z. Fouse
BY
Norman N. Holland
ATTORNEY

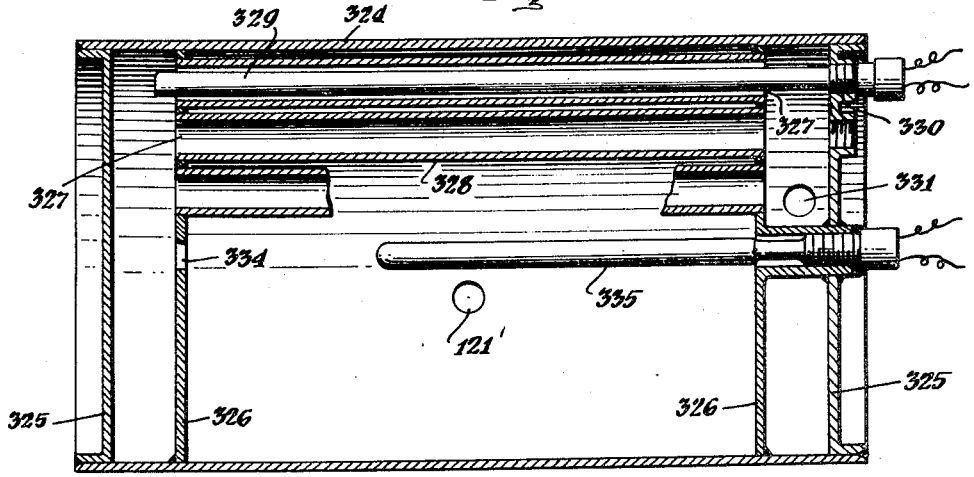
Fig. 28
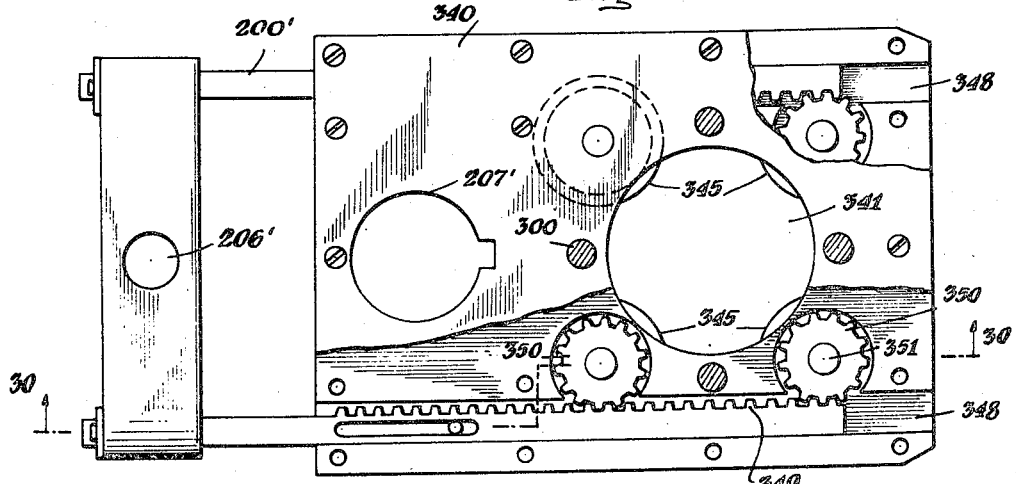
Fig. 29
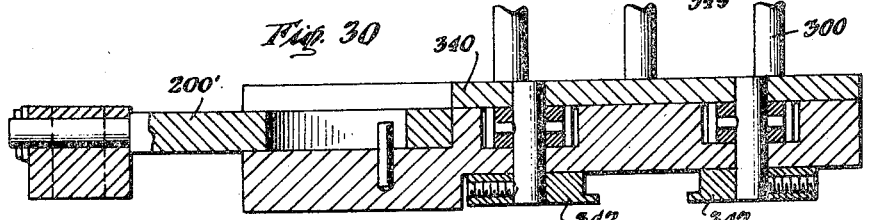
Fig. 30
Fig. 31
INVENTOR.
Frederick Z. Fouse
BY
Norman N. Holland
ATTORNEY June 6, 1950 F. Z. FOUSE 2,510,568
CONTAINER SEALING METHOD AND APPARATUS THEREFOR,
INCLUDING ROTARY SEALING HEAD, ROTARY
HEAD SPACER, AND CONVEYER MECHANISM
Filed Oct. 11, 1944 19 Sheets-Sheet 17

INVENTOR.
*Frederick Z. Fouse*
BY
*Norman H. Holland*
ATTORNEY

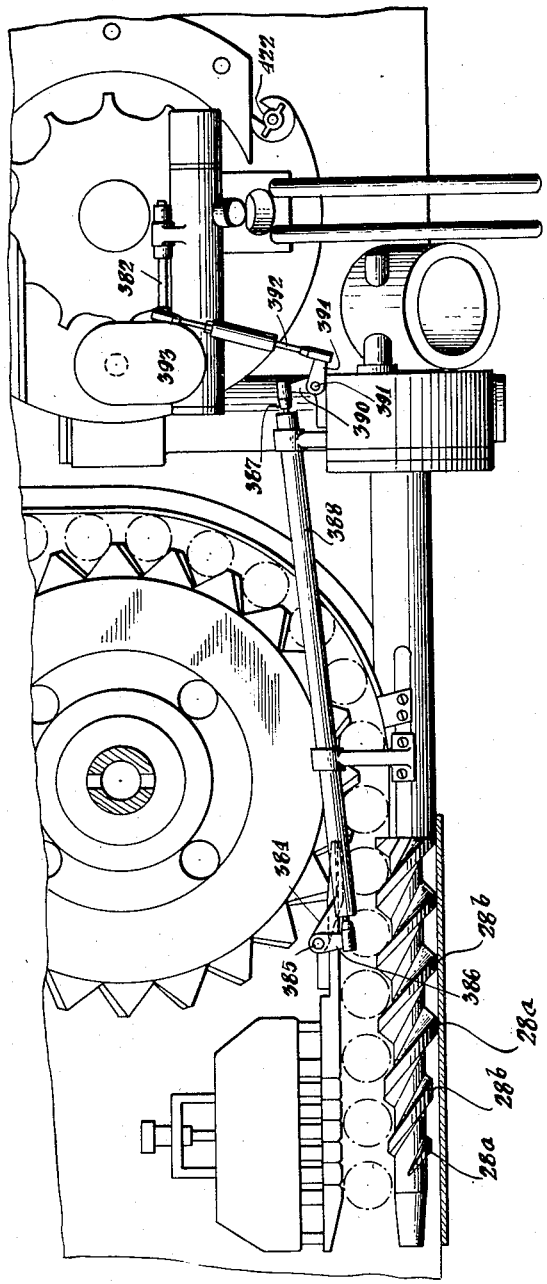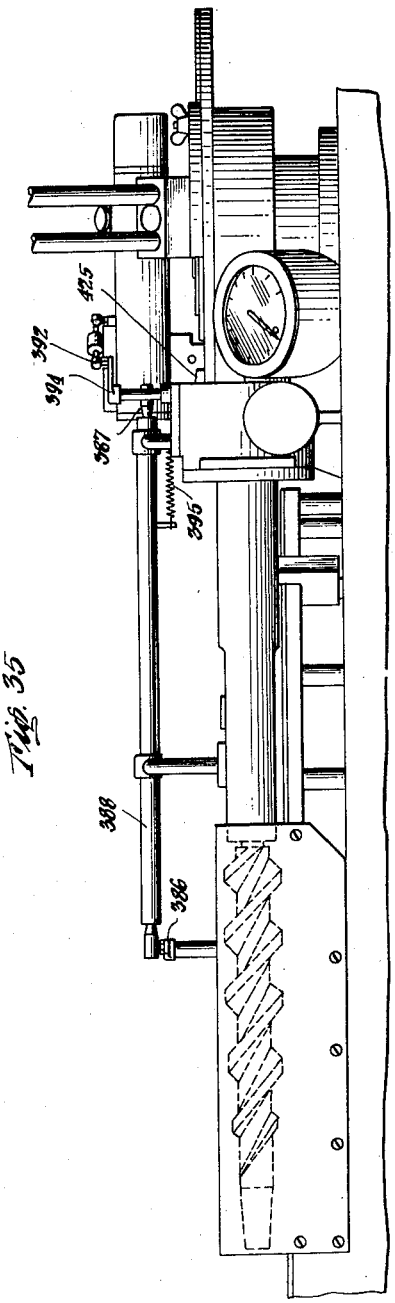

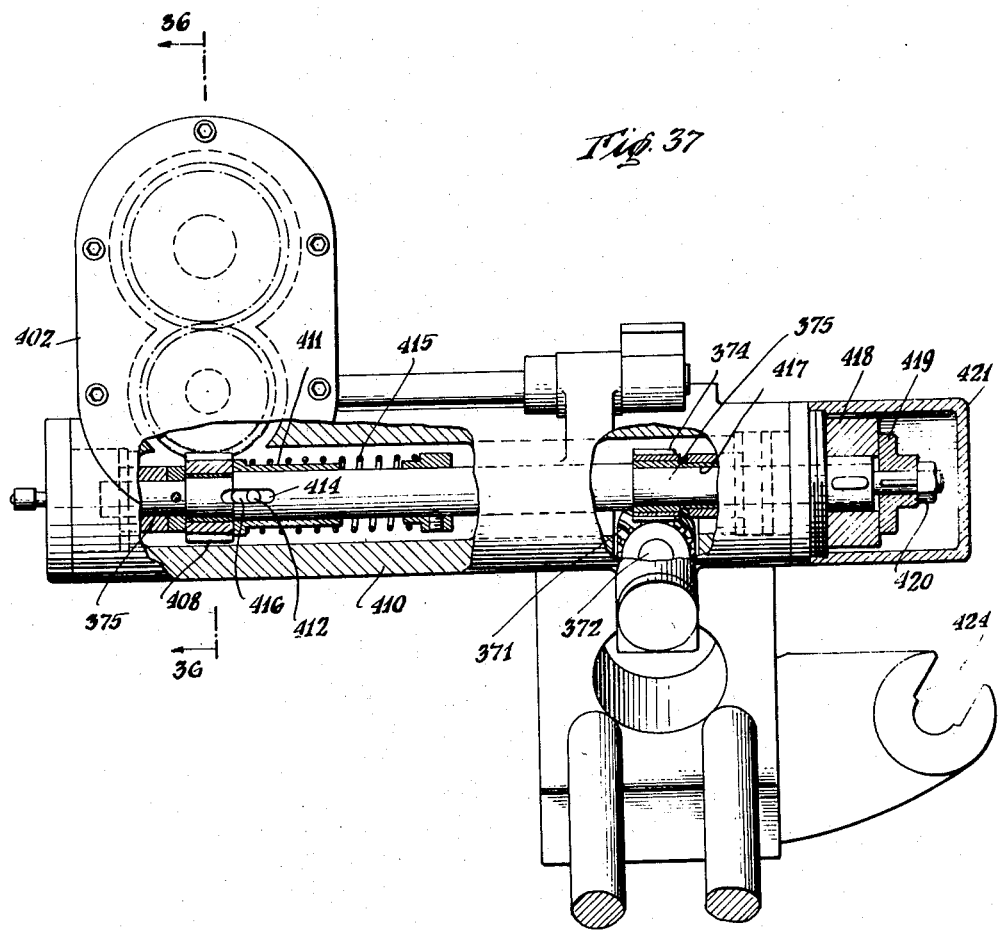
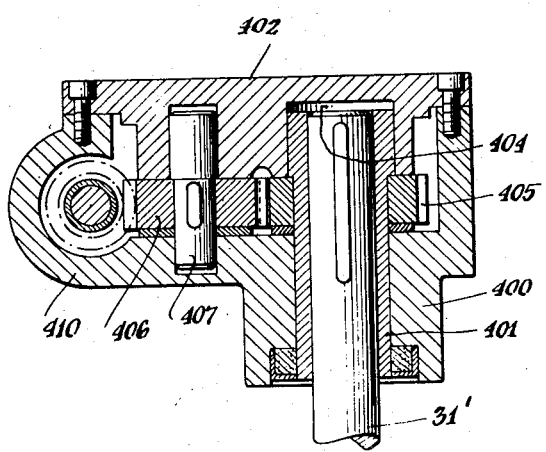

Patented June 6, 1950

2,510,568

UNITED STATES PATENT OFFICE 2,510,568

CONTAINER SEALING METHOD AND APPARATUS THEREFOR, INCLUDING ROTARY SEALING HEAD, ROTARY HEAD SPACER, AND CONVEYER MECHANISM

Frederick Z. Fouse, Lancaster, Ohio, assignor to Anchor Hocking Glass Corporation, Lancaster, Ohio, a corporation of Delaware Application October 11, 1944, Serial No. 558,226

30 Claims. (Cl. 226—82)

The present invention relates to the sealing art and more particularly to a method and machine for sealing containers.

In the sealing of containers, particularly glass containers, various problems are encountered. The containers vary in size, height and shape and hence convenient, rapid and effective adjustments for these are desirable. The filled containers may be delivered in groups or singly and the machine should be capable of handling them without requiring an operator to feed the containers one at a time. Likewise, it is desirable to deliver the closures in groups without requiring an operator to feed them individually. The containers are frequently too full for proper sealing with part of the material on the lips and sides of the containers, which tends to interfere with proper sealing. The containers should be under positive control during the passage through the machine to prevent toppling, spilling and breakage, which may require the machine to be stopped to clear up the refuse. Such interruption may also require stopping the filling machine and other equipment in line with the sealing machine.

The above requirements are complicated by the fact that high speed production requires the sealing of several hundred containers a minute. Many products require vacuum seals, which may be formed from the condensation of vapor in some instances and in other instances by a vacuum pump; other products should be sealed with inert gas therein, such as carbon dioxide. Sealing machines have heretofore been designed to achieve some of the above objectives. However, various requirements have necessitated special designs of machines. Packers prefer to have a single machine which may be placed in line with filling equipment to operate as a unit. To remove the machine from its semi-permanent position and substitute another is objectionable and time-consuming. In addition, the packer dislikes to carry several machines of different types in stock.

The present invention aims to provide a method and machine for receiving groups of containers and groups of closures and sealing them at a rate of several hundred a minute. The machine may be quickly adjusted for different sizes and shapes of containers and for different sizes of closures. The containers may be hermetically sealed with a high vacuum formed either by vapor condensation or by mechanical suction and may also be sealed with inert gases therein. The machine may be readily changed for the different types of seals required.

An object of the invention is to provide an improved sealing machine and method adapted to seal containers at a high speed.

Another object of the invention is to provide an improved sealing machine and method adapted to provide a high vacuum within the package.

Another object of the invention is to provide a high-speed sealing machine in which the product may be subjected to vapor or vacuum for a relatively long period prior to sealing to obtain a high vacuum.

Another object of the invention is to provide in a sealing machine improved means adapted to remove part of the contents from over-filled containers and to remove material from the lips of the containers prior to sealing.

Another object of the invention is to provide a sealing machine in which the containers are under positive control during their movement through the machine.

Another object of the invention is to provide an improved sealing machine in which a single conveyor conveys the containers in curved paths about the various mechanisms.

Another object of the invention is to provide a sealing machine in which the conveyor for the containers meshes with sprockets fixed to the various mechanisms to minimize relative movement therebetween.

Other and further objects of the invention will be obvious upon an understanding of the illustrative embodiment about to be described or will be indicated in the appended claims and various advantages not referred to herein will occur to one skilled in the art upon employment of the invention in practice.

A preferred embodiment of the invention has been chosen for purposes of illustration and description, and is shown in the accompanying drawings forming a part of the specification, wherein Fig. 1 is a front elevational view of the machine with the covers broken away to show the interior thereof;

Fig. 2 is a sectional view of the machine along the line 2—2 of Fig. 1 showing the movement of the containers through the machine and the various parts thereof;

Fig. 3 is a sectional view along the line 3—3 of Fig. 2, on an enlarged scale, showing a preferred embodiment of the mechanism for adjusting the star wheels for different sizes of containers;

Fig. 4 is a sectional view along the line 4—4 of Fig. 3, also on an enlarged scale;

Fig. 5 is a sectional view along the line 5—5 of

Figure 7:
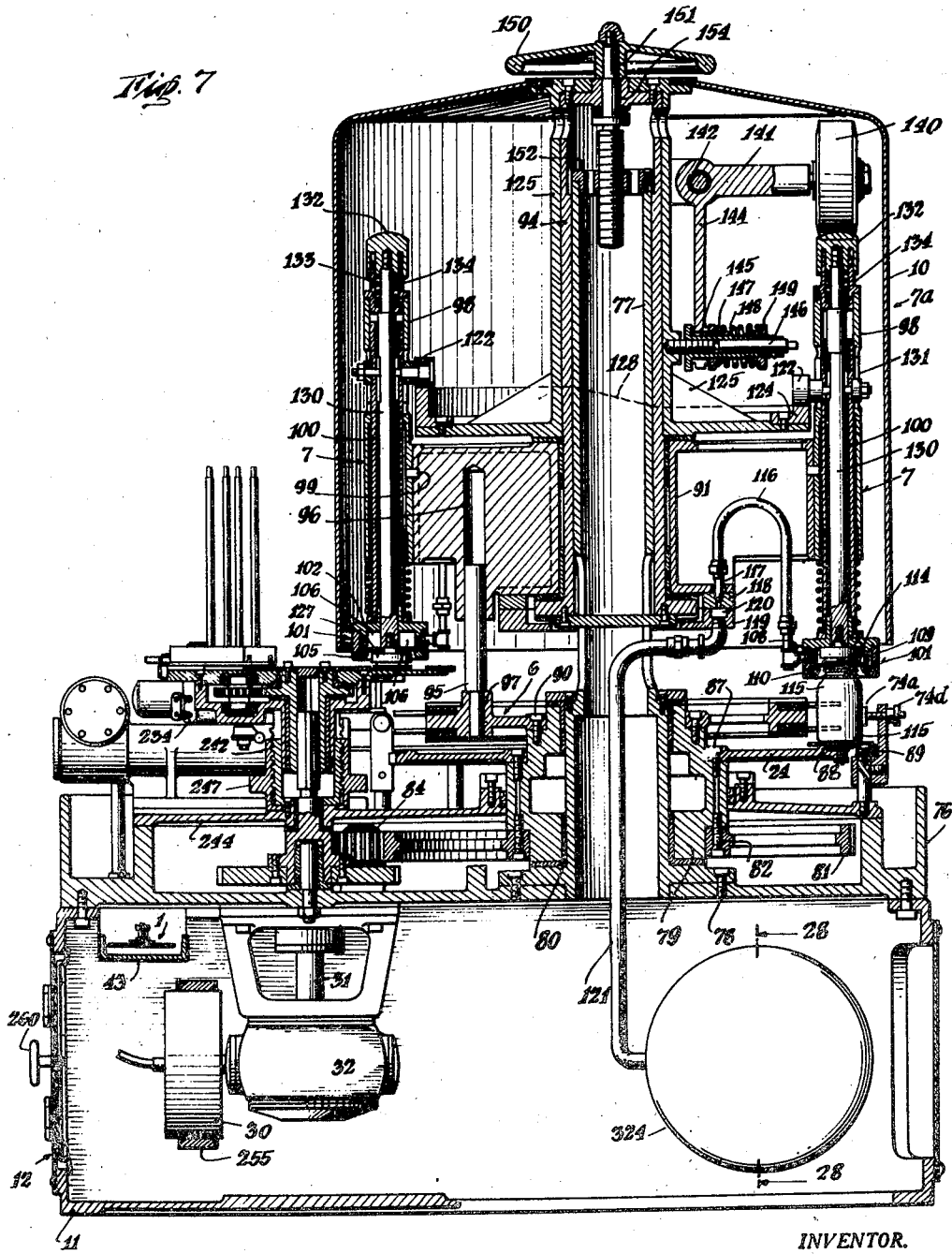
Figure 7A:
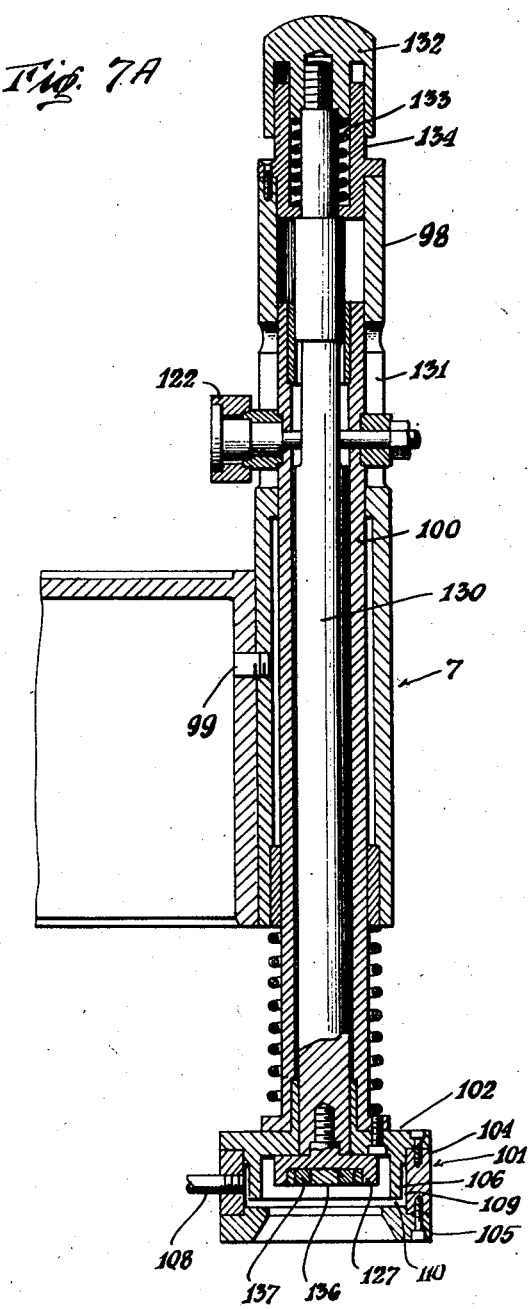
Figure 25:
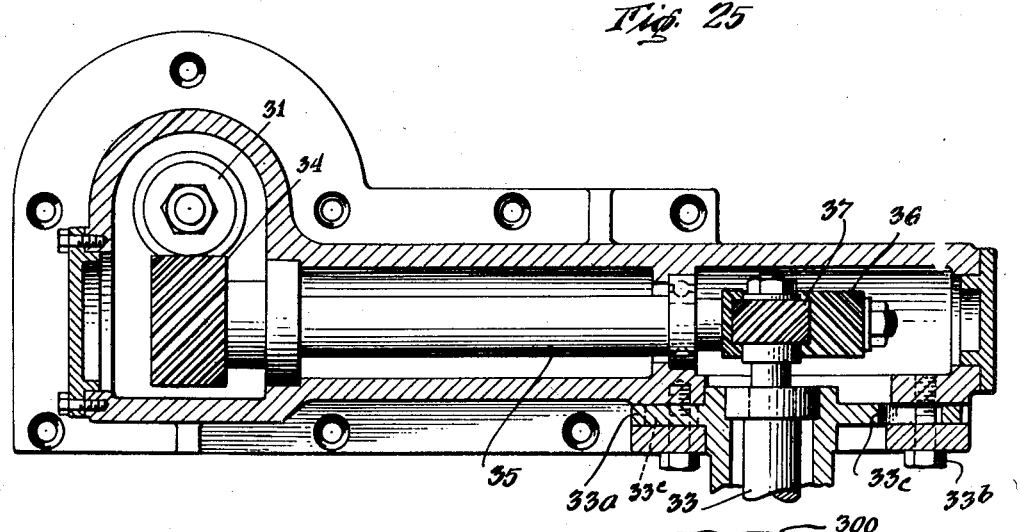
Figure 26:
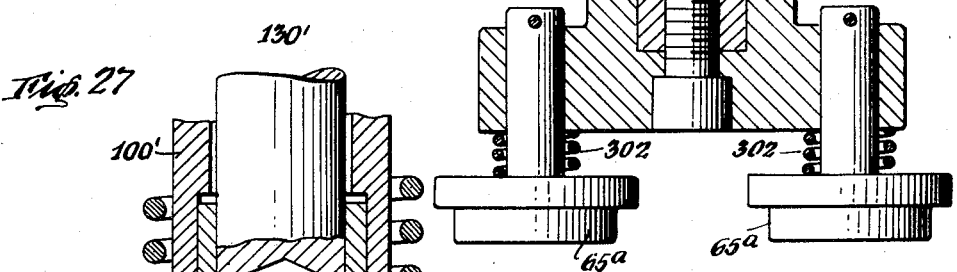
Figure 27:
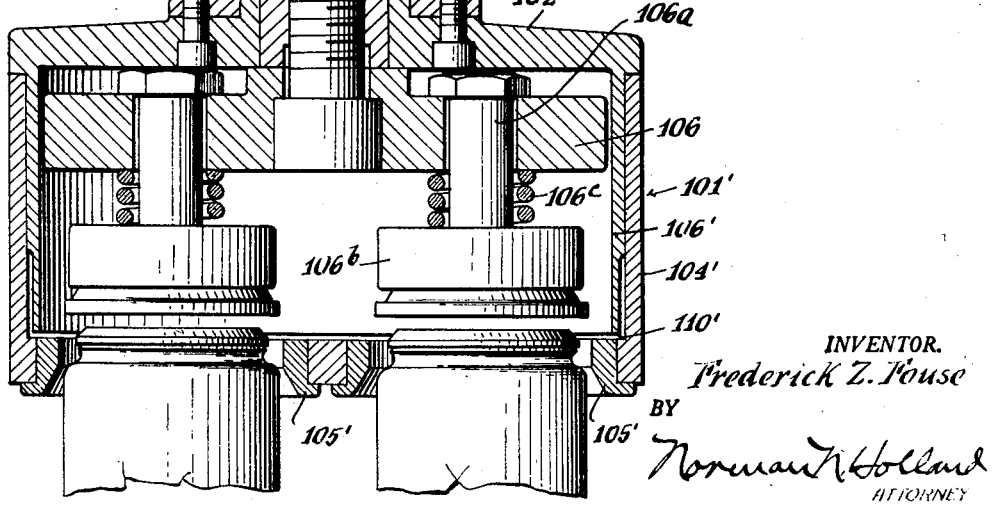
Figure 32:
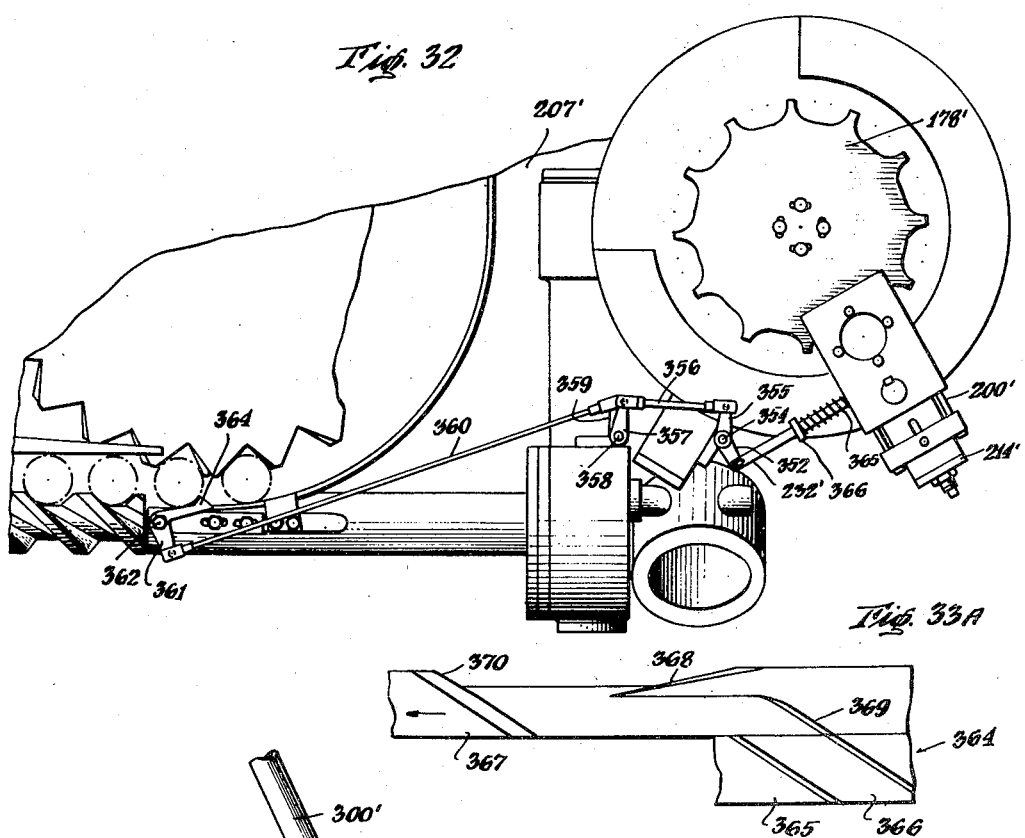
Figure 33:
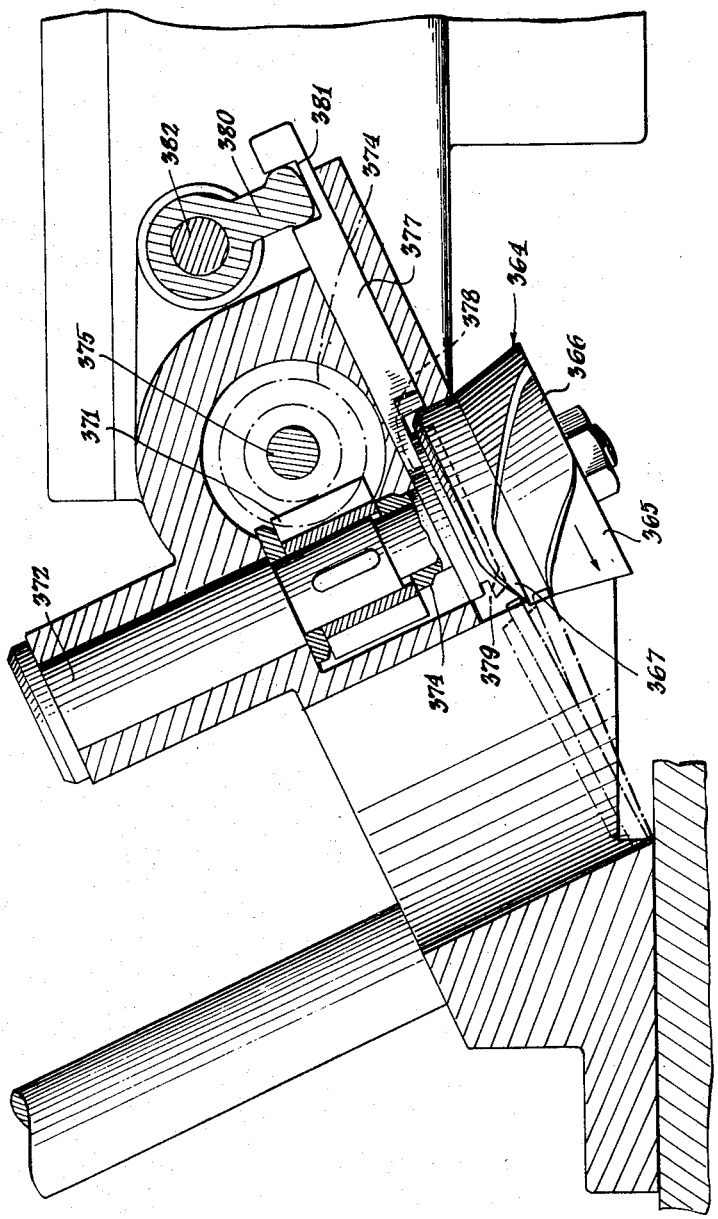

Fig. 2, also on an enlarged scale, illustrating the operation of the helicoid and its associated mechanism for spacing the containers as they enter the machine;

Fig. 6 is a sectional view along the line 6—6 of Fig. 2, also on an enlarged scale, showing details of the head specer;

Fig. 7 is a sectional view, also on an enlarged scale, along the line 7—7 of Fig. 2 through the sealing mechanism and through the cap feed illustrating details thereof;

Fig. 7A is an enlarged sectional view of a sealing head;

Fig. 8 is a sectional view, on an enlarged scale, along the line 8—8 of Fig. 2 through the sprocket engaging the conveyor as it leaves the sealing mechanism and illustrating the variable speed drive for the machine;

Fig. 9 is a sectional view along the line 9—9 of Fig. 2, also on an enlarged scale, showing the drive for the helicoid and for the sealing mechanism;

Fig. 10 is a fragmentary top-plan view of the cap feed and associated mechanism;

Fig. 11 is a sectional view through the cap feed along the line 11—11 of Fig. 10;

Fig. 12 is a fragmentary sectional view through the cap feed along the line 12—12 of Fig. 11;

Fig. 13 is a sectional view along the line 13—13 of Fig. 12;

Fig. 14 is a sectional view along the line 14—14 of Fig. 13;

Fig. 15 is a fragmentary sectional view illustrating the closures as they are being removed from a stack;

Fig. 16 is a fragmentary side elevational view illustrating the automatic means for controlling the feed of closures;

Fig. 17 is a fragmentary sectional view through one of the spacer heads illustrating details thereof;

Fig. 18 is a fragmentary sectional view through a sealing head as a closure is being delivered to it;

Fig. 19 is a sectional view through a sealing head adapted to form a vacuum about the mouth of the container as it is being sealed by utilizing a source of suction;

Fig. 20 is a sectional view of a sealing head for the machine adapted to form a vacuum by utilizing an explosive mixture;

Fig. 21 is a diagrammatic illustration of the movement of the conveyor through the machine;

Fig. 22 is a detailed top-plan view of a portion of the conveyor;

Fig. 23 is a detailed side elevational view of a portion of the conveyor partly in section;

Fig. 24 is a side elevational view, partly in section, of a hopper feed for delivering closures to the machine;

Fig. 25 is a fragmentary sectional view of a modification illustrating means for adjusting the helicoid laterally;

Fig. 26 is a fragmentary sectional view of a dual action head spacer;

Fig. 27 is a fragmentary sectional view of a dual action sealing head;

Fig. 28 is a view of the superheater partly in section along the line 28—28 of Fig. 7;

Fig. 29 is a top plan view with parts broken away illustrating another mechanism for removing the closures from the bottom of a stack;

Fig. 30 is a sectional view along the line 30—30 of Fig. 29;

Fig. 31 is an end view of the feeding mechanism shown in Fig. 29;

Fig. 32 is a top view of a mechanism responsive to the feed of containers for controlling the cap feed;

Fig. 33 is a sectional view of the preferred embodiment of cap feed and its attachment to the sealing machine;

Fig. 33A is a surface development of the cap separating parts of the mechanism of Fig. 33;

Fig. 33B is an enlarged sectional view of parts of the cap feed of Fig. 33;

Fig. 34 is a top plan view of the cap feed of Fig. 33 and its automatic control responsive to the feed of containers;

Fig. 35 is a front view of the cap feed shown in Figs. 33 and 34;

Fig. 36 is a fragmentary sectional view along the line 36—36 of Fig. 37 illustrating the connection of the cap feed drive with the sealing machine; and Fig. 37 is a top plan view partly in section illustrating the drive for the said preferred embodiment of cap feed.

Described generally with reference to the drawings illustrating a preferred embodiment thereof, the machine comprises a conveyor 1 (Fig. 2) which travels completely through the machine so that the containers do not have to be transferred from one conveyor to another. The containers when placed on the moving conveyor are spaced by a rotating helicoid 2 and pass into the adjustable star wheel 4 which cooperates with the guide rail 74 to hold the containers upright on the conveyor and in accurate position thereon as they pass through the head spacer 5a (Fig. 1) where a series of heads 5 remove excess material from over-filled containers and wipe the lips of the containers to remove any material thereon.

A second star wheel 6 receives and supports the containers as they pass through the sealing mechanism 7a (Fig. 1) having a series of sealing heads 7. The conveyor 1 delivers the sealed containers at the opposite end of the machine after they pass out of the sealing heads. The conveyor passes about a sprocket fixed to the head spacer and about another sprocket fixed to the sealing mechanism so that the parts move as a unit with the conveyor thereby to minimize any relative movement with respect to the conveyor. The star wheels hold the containers in accurate position for both the sealing heads and the head spacer. Closures are fed either from stacks or from a hopper to the sealing heads. The feeding of a closure to a head is automatically prevented unless a container has been delivered to be sealed by the head.

Figure 1:
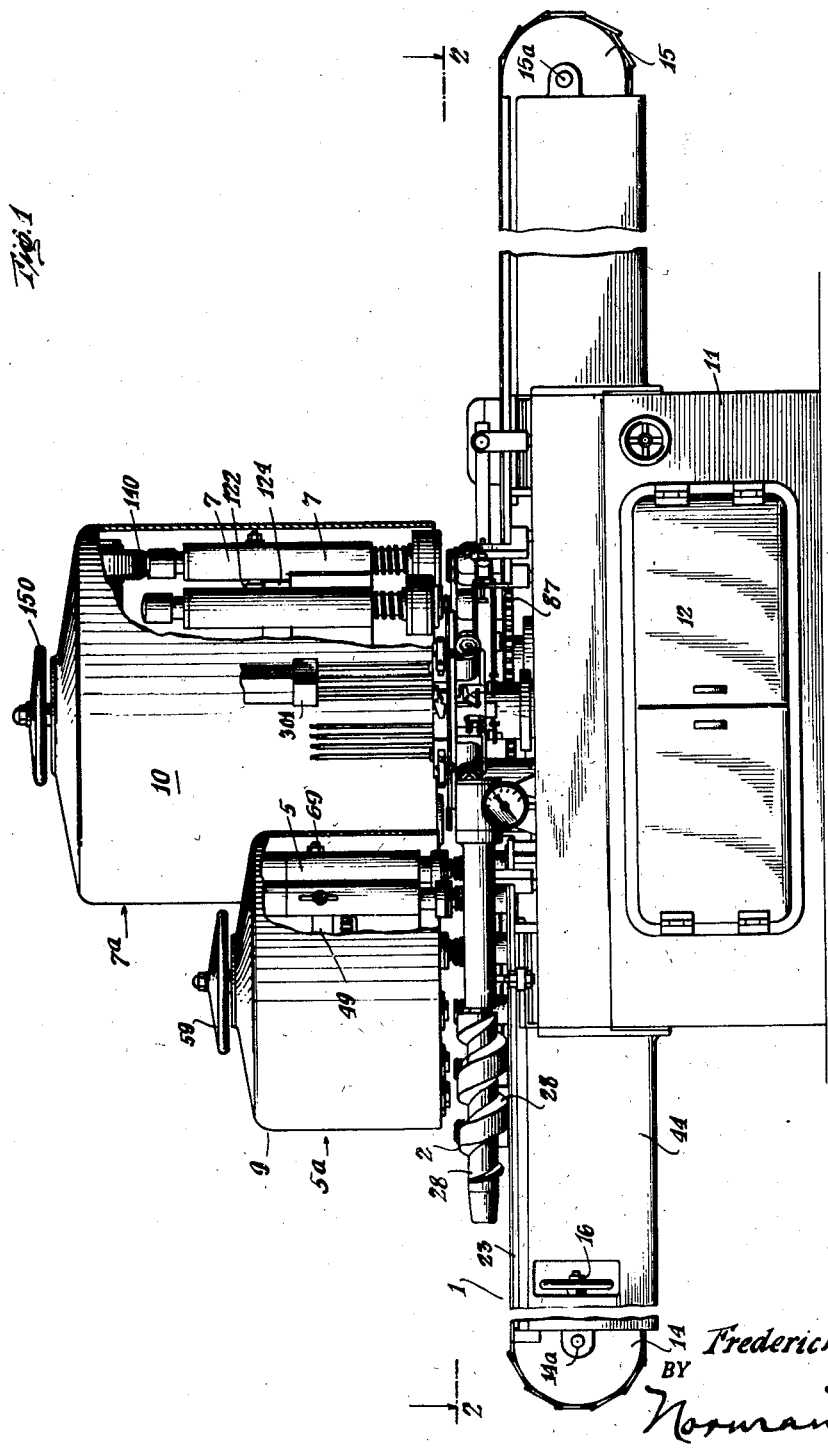

As shown in Fig. 1, the head spacer may be enclosed by a casing 9 and the sealing head by a casing 10. Likewise the drive for the machine and the supporting structure may be enclosed by a casing 11, which may be in the form of a casting for supporting the machine and which may have doors 12 to permit access to the enclosed parts.

The parts of the machine will now be described in detail with reference to the accompanying drawings and in the following order: (1) the conveyor, (2) the helicoid feed, (3) the head spacer, (4) the sealing mechanism, (5) the cap feed and (6) the drive.

*Conveyor*

The conveyor for moving the containers through the machine is shown more particularly in Figs. 1, 2, 21, 22 and 23. As described hereinafter, the conveyor is constructed so that it will flex either in a vertical plane or a horizontal plane to permit it to have a substantially universal movement between its parts. Certain of the sprockets for the conveyor are mounted to rotate about horizontal axes and others about vertical axes so that the conveyor will travel in the substantially U-shaped path shown in Fig. 2 in its movement through the machine. Sprockets 14 and 15 rotate about the horizontal shafts 14a and 15a mounted on suitable brackets. The shaft 14a for the sprocket 14 may be moved horizontally by means of the hand wheel 16 to increase or decrease the tension in the conveyor.

The construction of the conveyor 1 is shown more particularly in Figs. 22 and 23. The respective links 17 of the conveyor may be formed from sheet metal with portions 17a bent in one direction and perforated to form bearings having a vertical axis to receive a pin 18. Other parts of each link 17 are bent as shown at 17b and perforated to form bearings having a horizontal axis to receive a pin 19. Each link has members corresponding to the portions 17a and 17b of suitable size to fit within or without the portions of an adjoining link with perforations in alignment so that the links may be secured together by the vertical pin 18 and horizontal pins 19. The supporting surface of the conveyor is formed by a series of plate members 20, each of which may be secured to an upper part 17a of a link by rivets 21 or in any suitable manner. The plates 20 have a substantially semi-circular contour presenting a convex surface at one end and a substantially semi-circular contour presenting a concave surface at the other end. The convex surface of one end of a plate 20 fits into the concave surface of an adjoining plate. In this way, the conveyor may flex laterally as well as transversely. In passing over the vertical sprockets 14 and 15, the conveyor bends in a vertical direction about the pins 19 and operates as an ordinary link or plate conveyor. The upper strand of the conveyor may be supported by rails 23 bolted to the conveyor housing 44 (Fig. 5) and engaging the under sides of plates 20. In passing about the sprockets 22, 24 and 25, one of the supporting rails 23 is discontinued and that side of the conveyor is supported by the sprocket about which it is passing and the other side by the other rail 23. A drip pan 43 may extend under the lower strand of the conveyor (Figs. 6, 7, 8 and 9) as it passes through the base of the machine.

In the present machine, it is desirable to have the containers continue through the machine on a single conveyor and to avoid transfer of the containers from one conveyor or disk to another. For this purpose, there is provided the sprocket 22 fixed to rotate with the head spacer about a vertical axis. This sprocket 22 has U-shaped projections 26 which engage about the vertical pins 18 of the conveyor so that the conveyor flexes laterally as shown more particularly in Figs. 2, 6 and 21. Since the sprocket 22 drives the head spacer, relative movement is reduced to a minimum.

The fourth sprocket 24 is mounted (Fig. 7) at the base of the sealing mechanism to support the conveyor in a lateral direction during its movement thereabout. This sprocket 24 is fixed to and driven by the sealing mechanism. By driving the conveyor through this large sprocket 24, the driving force is spread over a number of sprocket teeth and minimizes wear on the conveyor. In addition, the conveyor moves with the sealing mechanism so that relative lateral movement between the conveyor and the sealing heads is eliminated or reduced to a minimum.

The fifth sprocket 25, Fig. 8, likewise mounted on a vertical axis, engages and guides the conveyor as it is passing from the sealing head to the sprocket 15. The sprocket teeth on the respective sprockets may be seen at 26 in Figs. 2, 10 and 21. In this manner, the conveyor moves through the machine flexing laterally to pass around the head spacer and the sealing mechanism and flexing vertically to pass over the sprockets 14 and 15.

Helicoid

The helicoid 2 and its associated mechanism is shown more particularly in Figs. 1, 2, 5, 9 and 25 and separates the containers as they enter the machine on the conveyor 1 so that they will register with the spaces in the star wheels and thus be properly positioned for engagement by the head spacing disks and by the sealing heads.

As herein shown, the helicoid may comprise a cylindrical member having a relatively wide spiral groove 28 therein. Upon rotation of the helicoid, the containers move along the groove 28 with their bottoms on the conveyor and become properly spaced a distance equal to that between two spiral surfaces of the grooves 28. This distance should correspond to the distance between the recesses in the star wheels 4 and 6. If desired a helicoid with a double spiral may be used as illustrated at 28a and 28b in Fig. 34, so that two containers enter and leave the helicoid during each revolution thereof. This form of helicoid is particularly adapted for small containers. The mechanism for driving the helicoid is shown more particularly in Fig. 9 wherein a driven pulley 30 drives a vertical shaft 31 through reduction gears 32. The vertical shaft 31 has a gear 34 meshing with a gear on one end of a shaft 35 which has a gear 36 at its other end meshing with a gear 37 on the helicoid shaft 33. In order to permit lateral adjustment of the helicoid to accommodate different sizes of containers the construction may be modified as illustrated in Fig. 25. The gear 36 is made sufficiently long so that the gear 37 on the helicoid shaft 33 may be shifted laterally thereon. The mounting 33a for the shaft 33 is slidably mounted by bolts 33b fitting in slots 33c to permit the adjustment.

It is desirable to guide the containers as they pass along the helicoid to hold them in the groove 28. While various types of guides may be used for this purpose, the preferred embodiment provides, as shown more particularly in Figs. 2 and 5, a sectional guide bar 38, the several sections 38a of which are mounted upon pins 38b fitting into sockets in a supporting member 39. The pins 38b and the bar sections are retained in their outer position, determined by the pins 38b by means of springs 38c fitting in the sockets as shown in Fig. 5. Thus the sections of the bar 38 are resiliently mounted so that they move outwardly from the helicoid in response to pressure applied by the containers. The entire sectional bar 38 and the supporting member 39 therefor may be adjusted inwardly or outwardly for different sizes of containers by means of the threaded adjustment rod 40 operated by a knob 41 to slide the member 39 on the horizontal part of the supporting bracket 42. The supporting bracket 42 may be adjusted in a vertical direction by means of a rod 40a which is similar to the rod 40 and a knob 41a operatively mounted in a second supporting bracket 42a secured to the conveyor housing 44. Thus the sectional guide bar 38 may be quickly adjusted as an entirety in a vertical direction so that the containers may be engaged at any desired vertical position and in a lateral direction to accommodate different sizes of containers.

*Head spacer*

The head spacer is shown more particularly in Figs. 1, 2 and 6 and is for the purpose of removing excess material from over-filled containers and for wiping the rims of the containers to remove matter which might, otherwise, impair the seal. The head spacer comprises a vertical member or column 45 seated at its bottom in a cylindrical recess 46 in a base member 46a mounted on a supporting casing 47. The lower part of the column has the conveyor sprocket 22 thereon and the star wheel 4 for holding the containers in place. The upper part of the column has the head spacer units and the mechanism for operating them.

Referring to the lower part first, the sprocket 22 for the conveyor 1 is bolted to an integral annular part 22b on a hub 22a which rotates about the column 45 and rests upon the bearing on the upper side of the member 46a. The star wheel 4 is bolted to a hub 22a at its upper part so that the star wheel and the sprocket 22 rotate together about the column 46. As described hereinbefore, the conveyor is driven by sprocket 24 associated with the sealing mechanism and since it engages the sprocket 22, it likewise drives the star wheel 4.

Referring to the upper part of the column, a rotary turret or head 49 is mounted above the star wheel 4 with a bearing 50 and bushings 51 extending about the vertical cylindrical member 53. The turret or head 49 carries a series of head spacer units 5 which will be described hereinafter. The upper end of the column 45 has a second cylindrical part 54 extending downwardly with a flange or annular horizontal part 55 at its bottom. On one side of the flange portion 55, an annular gear 56 is bolted to mesh with a gear 57 for rotating the head spacer disks 52. On the other side of the horizontal part 55, a fixed cam 58 is bolted for raising and lowering the respective head spacer disks. The member 54 together with the cam 58 and the gear 56 are stationary, since the part 54 is bolted to the upper end of the member 53 fixed to the column 45. The casing or enclosure 9 for the head spacer is likewise bolted to the upper end of the part 54. The mounting for the head spacer units may be moved vertically as an entirety by means of a handwheel 59 having a shaft 59a threaded to the upper part 45a of the column 45. Suitable slots 45b cooperate with the cross member 60 to permit vertical movement along the column and to prevent rotary movement. The turret or head 49 carrying the head spacer units includes one or more driving pins 61 extending into one or more recesses 62 therein and rigidly mounted on the star wheel 4 at 64. Thus the head 49 and spacer units 5 thereon are rigidly connected to rotate with the star wheel 4 and the units are freely movable in a vertical direction without disturbing the drive therefor.

The respective head spacer units 5, one of which is shown in detail in Fig. 17, each comprise a disk 52 having a smaller disk 65 thereon which is forced down into the container to displace the excess contents of over-filled containers. Above the smaller disk 65 and extending about its rim is a wiper 66 which may be made of rubber, "neoprene" or any other suitable material and serves to wipe the rim of the container. The parts 65 and 66 are mounted on a vertical shank 67 having the gear 57 at its upper end meshing with the gear 56 for rotating the parts 67 and 66 as they move around the column 45. The shank 67 is supported in the cylindrical part 68 by means of a pin 69 having a cam roller 70 in engagement with upper edge of the cam 58. A suitable spring 71 forces the parts downwardly so that the cam roller 70 runs on the cam 58. In the event that the small disk 65 fails to register with the mouth of a container and, instead of going into the mouth, engages the rim, the parts may move upwardly in opposition to the spring 71 to avoid breakage of the container. The gear 57 is sufficiently wide to permit this vertical movement of the parts under the influence of the cam 58 without disturbing the connection between the gear 56 and gear 57. Thus, as the mounting for the several spacer units is rotated by means of the pins 61 connected to the star wheel 4, the heads are lowered so that the smaller disks 65 telescope into the containers as they register successively therewith, and displace excess material from over-filled containers. When the smaller disk 65 is forced into a container, the wiper 66 rotates with respect to the container and wipes the rim of the container so that a better seal is obtained. It will be understood that the construction of the member 66 can be varied without departing from the scope of the invention.

Where small jars are being sealed, such as those used for baby foods, a dual action head may be utilized as shown in Fig. 26. The rod 300 may be raised and lowered by cam 58 and cam roller 70 (Fig. 6) and may have twin parts 65a secured thereto by a member 301 for engaging and entering the mouths of the containers. The parts 65a are slidable upwardly in opposition to springs 302. Thus two containers are engaged on each downward movement of this dual action head spacer.

With different sizes of containers, it is desirable to adjust the size of the spaces in the star wheel 4 so that they fit the container. For this purpose, the star wheel is provided with a pair of contiguous (Figs. 2, 3 and 4) upper disks 4a and 4a', having V-shaped projections 4b thereon and a pair of contiguous lower disks 4c and 4c' having V-shaped projections 4d thereon. By moving the two disks 4a and 4a' with respect to each other, the spaces 4e therein for receiving the containers may be varied in width as desired. Similarly by moving the two disks 4c and 4c' with respect to each other the space 4e' therein for receiving the containers may be varied as desired. The spaces 4e and 4e' should be directly above each other to hold the containers upright. These adjustments are achieved in the present embodiment of the invention by the mechanism shown more particularly in Figs. 3 and 4. The outer disks 4a and 4c may be rotated by gear 4f meshing with suitable rack teeth in these disks and the inner disks 4a' and 4c' may be rotated by gear 4g meshing with gear teeth in these disks. The gears 4f and 4g may be rotated by applying a wrench to the end 4h of the rod 4j having a gear-engaging collar 4k thereon. Thus a wrench may be inserted on the end 4h of the rod 4j to pull it in or out by its thread 4t and the spaces in the upper and lower pairs of disks forming the star wheel 4 may be changed to accommodate jars of different sizes. The adjusting means assures the space 4e in the upper pair of disks being the same width as the space 4e' in the lower pair and also assures their being directly above each other.

Referring more particularly to Fig. 2, it will be noted that the containers are held in the star wheel 4 by an adjustably mounted guide rail 74 and remain in the star wheel of the head spacer for approximately ninety degrees. During this period, the displacement disks 65 enter the mouths of the containers, displace excess liquid and the wipers 66 wipe off the rims of the containers. As the containers leave the head spacer, they move between adjustably mounted guideways 74a and 74 into the star wheel of the sealing mechanism and continue along the guide 74a in the star wheel for about one-half the circumference of the sealing mechanism. During this period, a cap is placed on the container, a vacuum formed in the container and the cap sealed to the container. These operations are performed by the sealing mechanism which will now be described.

*Sealing mechanism*

The sealing mechanism is shown more particularly in Figs. 2 and 7 and may comprise a series of sealing heads which rotate about a central column. Caps are fed to the respective sealing heads. Containers are aligned by the star wheel under the sealing heads. The proper atmosphere or vacuum is created between the closure and the container during a part of the movement and the cap is then applied to the container. The sealing mechanism is mounted on the base of the machine and has a bottom casing 76 attached to the base of the machine. A central column 77 is bolted at 78 to the casing 76. The star wheel and the gear for driving the parts are mounted about the bottom portion of the column and the sealing heads are mounted to rotate about the upper part of the column.

A hub member 79 is mounted about the lower part of the column 77 with bushings 80 to minimize wear. A gear 81 is bolted at 82 to the lower part of the hub 79 and meshes with a gear 84 (Fig. 9) on stub shaft 85 which in turn meshes with gear 86 on the drive shaft 31 operatively connected to the reduction gears 32 and the motor drive. In this manner, the hub 79 and the sealing mechanism are driven through the intermediation of gears 81, 84 and 86, the latter being on the drive shaft 31.

The horizontal sprocket 24 for the conveyor 1 is bolted at 87 to the upper part of the hub 79 to engage the pins 18 (Fig. 23) of the conveyor with the U-shaped portions 26 in the periphery thereof and to support the inner side of the conveyor at 88. The outer side of the conveyor is supported on the arcuate member 89 spaced from the periphery of the sprocket 24. The sprocket 24 on the hub 79 drives the conveyor about the sealing head and also serves as the driving means for the conveyor as an entirety. By reason of the utilization of the large sprocket 24 for driving the conveyor, less strain is placed on the individual links and less wear results. In addition, the conveyor is accurately positioned with respect to the sealing heads to assure registry of the closure with the mouth of the container at the time the closure is applied to the container.

The star wheel 6 for retaining the containers in position as they pass about the sealing mechanism, is bolted at 90 to the upper part of the hub 79 and is likewise driven by the hub. The construction of the star wheel 6 may be identical with the construction of the star wheel 4 for the head spacer and a detailed description is not believed to be necessary. The adjustment means for increasing and decreasing the V-shaped recesses for receiving the containers is the same as described with reference to star wheel 4 for the head spacer and is illustrated more particularly in Figs. 3 and 4. A semi-circular guide rail 74a extends about the sealing mechanism to hold the containers in the star wheel and is adjustable by means of set screws 74d toward and away from the star to cooperate therewith in centering different sizes of containers on the conveyor with respect to the sealing heads. The star wheel 6 and the conveyor sprocket 24 are each bolted to the hub 79 and move together as a unit about the central column 77.

A casting 91 is mounted about the middle of the column 77 for receiving and mounting the respective sealing heads 7. The casting 91 has a central bearing extending about a cylindrical member 94 telescoped over the central column 77. The casting 91 is driven by the star wheel 6 by means of rods 95 fitting into cylindrical bores 96 in the casting with their lower ends fixed in bearings 97 in the star wheel 6. Thus the casting 91 is rigidly connected to the star wheel and rotates with it. The sealing heads 7 are mounted about the outer periphery of the casting 91.

In the preferred embodiment, the sealing heads each comprise an outer cylindrical member 98 fixed to the casting 91 at 99. A second cylindrical member 100, slidably mounted within each outer cylindrical member 98, has secured to its lower end a hood 101 adapted to extend about the upper end of a container and substantially enclose it. While the hood may take various forms, it is illustrated herein as comprising an upper cap member 102 secured to the lower end of the cylindrical member 100, a middle annular member 104 and a bottom annular member 105. The members 102, 104 and 105 are bolted together to serve as a unit. The cap member 102 has a depending skirt 106 which extends downwardly to approach the upper surface of the annular member 105, but is separated from it by a slight space which serves as an annular port, either for the introduction of steam or an inert gas at the time of sealing or for the removal of air from the hood by a suction device. For this purpose each head 7 is shown in Fig. 7A as including a pipe attachment 108 threaded to the central member 104 and opening into an annular chamber 109 back of the annular port 110. It will be noted at the right side of Fig. 7 that a closure cap 114 is shown spaced from the mouth of the container 115 and that the space between the closure and the container is slightly above the annular port 110 in the preferred embodiment, thus the injection of steam or gases is directed at the tapered edge of the container completely about the periphery thereof. The tapered edge deflects the vapors between the cap and the container and upwardly into the interior of the cap to dislodge air therefrom. While the position described above is preferred other positions may be utilized.

In sealing containers and forming a vacuum by the condensation of steam therein, the steam condenses rapidly and frequently condenses before the container can be sealed, thus drawing air into the container and impairing the vacuum. The present method of injection in which steam passes between the cap and the container completely about its periphery reduces the distance that the steam has to be applied at any one point to substantially the radius of the closure and not to the diameter of the closure. In addition the complete periphery of the cap and rim of the container is surrounded by the steam jet. In this way, there is less opportunity for the steam to condense prior to the sealing of the closure and any such condensation draws in additional steam from the surrounding jet. In addition, the space that has to be filled with steam is reduced to a minimum. In view of the fact that the steam may be applied to the hood for an angular distance of one hundred eighty degrees or more about the sealing mechanism, the injection may continue for a substantial period and thus heat up the closure and the space about the container, which again minimizes the amount of air that is drawn in due to condensation prior to the sealing of the closure and increases the vacuum in the sealed container. If desired, the supply of steam may be regulated so that the injection of steam is increased substantially at and just prior to the sealing of the container. In other words, a small supply of steam may be supplied to the hood for heating a closure and the upper end of the container initially and a substantially increased amount may be supplied just prior to the sealing operation and during the sealing operation. In this way, a very effective vacuum is obtained with a minimum steam requirement. Ordinarily the speed of the machine is such that the two stages are not necessary.

Where small containers are sealed a sealing head may be utilized for sealing two containers at a time in a single head. A preferred embodiment of such a construction is shown in Fig. 27 where the parts corresponding to those shown in Fig. 7A are similarly numbered and differentiated by primes. The slidably mounted cylindrical member 100' has secured to its lower end an oval hood 101' adapted to extend about the upper ends of two containers and substantially enclose them. The hood is illustrated as having an upper cap member 102' secured to the lower end of the cylindrical member 100' together with the middle annular member 104' and two bottom circular members 105' for telescoping over the upper ends of two containers as shown in Fig. 27. The cap member 102' has a depending skirt 106' the lower end of which is spaced from the upper surfaces of the annular members 105' and their connecting parts to provide the annular part 110' for the introduction of steam, vapor or gas at the time of sealing or for the removal of air by a suction device. The head is connected to the conduit 116 as shown in Fig. 7 for this purpose. Preferably the annular port 110' directs the vapor or gas at the tapered edge of the container as shown to deflect it across the mouth of containers and upwardly into the interior of the closures which in turn deflect it downward into the containers. This provides an effective removal of the air and a very high vacuum. The two sealing disks 106' for supporting the closures and sealing the containers are supported by the member 130' by means of yoke 106a, pins 106b, and compression springs 106c. The operation is otherwise the same as the sealing head for a single container shown in Figs. 7 and 7A.

The steam for the hoods of both the single and dual action type may be superheated and may be supplied to the nozzle or inlet 108 by means of a flexible tube 116 secured at its opposite end by an attachment 117 to an annular closure member 118 which slides on a fixed annular port member 119 having an arcuate channel 120 extending for about 180° about the sealing mechanism along the travel of the attachments 117 to connect with the various members 107 during that part of their travel. In other words, the member 119 and the channel 120 therein communicate with each of the members 117 for a substantial part of their movement about the sealing mechanism. The channel 120 may be connected to a supply of steam through a conduit or conduits 121 extending down through the central part of column 17 to a superheater 123 (Figs. 7 and 28) connected to a suitable source of steam supply. Suitable water traps may be utilized for any condensate formed in the steam line or in the sealing head.

While various forms of superheaters may be utilized, where superheated steam is desired, a preferred embodiment is illustrated in Figs. 7 and 28 and comprises an outer casing 324 in the form of a cylindrical drum, having closed ends 325. A partition 326 is provided adjacent to but spaced from each end of the drum. These partitions have aligned apertures 327 fitted with cylindrical tubes 328. Electrical heating units 329 are removably fitted in the apertures in one end of the drum by means of the screw threads 330 to extend into the respective tubes 328 and preferably to extend the entire length thereof. Steam may be admitted to one end of the drum by a pipe 331 between the partition 326 and the end of the drum. The outlet to the conduit 121' for the steam is preferably in the side of the drum intermediate the partitions 326. To reach the outlet the steam passes through the tubes 328 in contact with the outside of the heaters 329, through an aperture 334 in the partition 326 at the opposite end of the drum and about the outer surfaces of the tubes 328 to the conduit 121. This provides an effective transfer of heat to the steam. A thermostat 335 may be utilized to fix the maximum and minimum temperatures of the steam leaving the drum and to control the extent of superheating. Five or six hundred degrees of superheat have been found to give excellent results.

The hood 101 of each sealing head is supported by a cam roller 122 riding upon a stationary cam 124 near the top of the cylindrical member 98. The cam 124 is bolted to a cylindrical member 125 flanged at its lower part and telescoped about the cylindrical member 94 forming a part of the column for the sealing head. It will be noted that the cam 124 has a raised portion at the left of Fig. 7, where the closure is picked up by the sealing head as will be described hereinafter, so that a closure may be applied to the disk 127 of the sealing head. Thereafter the hood is moved in raised position until it gets above a container, so that the container may freely move beneath the closure. Then the surface of the cam 24 declines as shown at 128 so that the hood 101 encloses the upper end of the container. Steam is then applied to the hood by entering through the arcuate channel 120, as described above. After the sealing operation, which will be described later, the cam raises the hood above the top of the container so that the container may pass out of the sealing head.

The closures used herein may be of the type illustrated in the Norman N. Holland Patent No. 1,909,406 owned by the assignee hereof which are sealed by downward pressure on the closure to force the closure over the rim of the container to form a seal on the sidewall thereof. Other types of closures may also be used, for example, closures which have a gasket secured to the cover part of the closure to form a seal on the rim of the container. The sealing heads illustrated herein may be used for sealing either of said types of closures and closures similar to them. Other types of closures may require variations in the sealing head, however, the invention is not limited to the particular type of closure or container utilized.

Referring further to Figs. 7 and 7A of the drawings, each of the disks 127 which raise and hold the closures magnetically, is attached to the rod 130 which extends through the cylindrical member 100 of the sealing head and has a slot 131 which permits it to move vertically independently of the position of the cam roller 122 and the pin on which it is mounted. The upper end of the rod 130 has a threaded cap 132 thereon with a groove which fits about the end of a member 134 on the end of the cylindrical member 98. A coil spring 133 retains the cap 132 in its upper position and also retains the disk 127 attached to the other end of the rod 130 in its upper position under normal conditions, the upper limit being determined by the engagement of the shoulder on the upper end of the rod 130 with the bottom of the member 134. Each disk 127 preferably has an insert 136 (Fig. 7A) made of brass or other suitable non-magnetic material with a plurality of magnets 137 therein. The brass insert requires the lines of force from the small magnets to pass through the closure cap held on it and renders the magnets more effective. Each disk 127 with the magnets therein is adapted to pick a closure off of the cap feed as will be described herein and carry it around the sealing mechanism. As it passes over a container, it registers with the top of the container so that when the rod 130 is forced down, it will force the cap on the container.

Any suitable device may be utilized for forcing the rod 130 down and the cap on the container. As shown herein, an overhead pressure roller 140 is provided and journalled on one leg of a bell crank 141 pivoted at 142 with the other leg 144 forked at its end to fit about a sleeve 145. The sleeve 145 is held in position by a pin 146 threaded into the cylindrical member 125. Mounted on the sleeve 145 is a second sleeve 147 and a threaded member 149. By rotating the threaded member, the tension on the spring 148 may be increased or decreased. The tension in the spring determines the pressure applied to the bell crank 141 to resist upward movement of the roller 140. As a sealing head moves under the roller, the cap 132 and the rod 130 mounted thereon are forced downwardly under resilient pressure. The amount of pressure is determined by the spring 148 on the sleeve 145. Preferably a roller is utilized as it minimizes friction and at the same time forces the rod down quickly thereby minimizing any chance of the steam within the container condensing prior to the formation of a hermetic seal. This increases the vacuum in the container by preventing air from being sucked in by the condensation of the steam within the container during the sealing operation.

As different heights of containers are required to be sealed in the same machine, provision for suitable adjustments therefor is provided by means of a hand wheel 150 at the top of the sealing mechanism. The hand wheel is mounted on a shaft 151 threaded into a member 152 mounted on the upper end of the column 77. The shaft fits into a bearing 154 formed in the upper end of the member 94 telescoped about the vertical column member 77. Rotation of the hand wheel 150 raises or lowers the member 94 with respect to the central column 77. In view of the fact that the casting 125 having the cam 124 thereon, is mounted on the casting 94, rotation of the hand wheel 150 raises and lowers these several parts so that the sealing heads and the cams for their operation all move in a vertical direction to accommodate containers of different heights without requiring additional adjustment.

As stated hereinbefore, it is desirable in some instances to fill the containers with an inert gas such as carbon dioxide. By connecting the steam conduit 121 of the machine to a supply of carbon dioxide, the containers may be filled with carbon dioxide or any other gas instead of steam. No change in the sealing heads or other parts of the machine is required.

In other cases, it is desirable to form a vacuum by using a suction pump as the small amount of condensate formed as a result of the use of the vapor may be objectionable in the product. In such cases, it is necessary to enclose the upper end of the container in order to form the vacuum. A sealing head embodying this principle is shown in Fig. 19. It differs from the sealing head described with respect to the preferred embodiment in that the lower member 105a thereof has an annular groove formed in its inner periphery and a gasket 155, made of rubber or a similar material, is secured in the groove as shown in Fig. 19. The gasket is suitably shaped, preferably with a depending part 156, to engage the shoulder of a container and form an airtight connection therewith. With this gasket 155 in place, a small chamber is formed about the upper end of the container when the cam roller supporting the hood passes over the decline 128 in the cam and moves to its lower position. The vacuum may be obtained by connecting a suitable exhaust pump or vacuum tank to the conduit 121. The vacuum may be applied to the container for an angular distance of some one hundred eighty degrees about the sealing mechanism and a high vacuum obtained. In addition, the vacuum tends to draw the gasket 155 against the container which renders the gasket very effective in forming a seal with the shoulder of the container.

It is also desirable in some instances to form a vacuum by exploding a combustible mixture about the upper end of a container at the time a seal is formed. The principles of such sealing are described in the patent to William D. Bell No. 2,284,631 owned by the assignee hereof. A sealing head is shown in Fig. 20 for applying the principle to the present machine. The sealing head is similar to the sealing head of the preferred embodiment with the exception that an igniter in the form of a spark plug 160 is threaded into the annular member 104 of the sealing head and extends through an aperture 161 in the downwardly depending part 106 of the sealing head. A suitable electrical connection 162 may supply an electric current of high potential at a suitable point in the movement of each sealing head to explode the gas therein. A suitable check valve may be provided in the gas conduit for the gas attachment 108' to avoid formation of pressure in the gas line as a result of the explosion, although the gas line may be sufficiently small to eliminate the necessity for this, since there is a substantial opening about the mouth of the container permitting escape of the explosive gases.

In the operation of the sealing mechanism, the closures are fed as will be described hereinafter and picked up magnetically by each sealing disk 127, as it passes over a closure. At that time, the disk 127 is below the hood 101 as shown in the sealing head at the left of Fig. 7. The sealing head continues with the parts in this position, until the disk 127 registers with a container on the conveyor 1 moving in the star wheel 6 of the sealing mechanism. At that point the cam 122 rides down the decline 128 in the cam 124 and permits the hood 101 to pass down over the disk 127 and over the upper end of the container. At this point, the closure is spaced slightly from the upper end of the container as shown more particularly in the sealing head at the right of Fig. 7 and as shown in a larger view in Fig. 20. Also, at this time, the steam dispensing conduits 116 reach the annular steam supply channel 120 so that steam is delivered to the respective sealing heads and continues to be delivered to them until each sealing head passes under the roller 140. At that point, the closure is quickly forced onto the container to form a hermetic seal. The steam inlet port in the sealing head, in the preferred embodiment, is annular and substantially at or slightly below the rim of the container so that the steam is directed between the cap and the container as they are held in spaced relation. In this way, steam is injected from all sides to completely remove the air and to minimize condensation of the steam occasioned by the closure or the contents of the container being at a lower temperature than the steam. Such condensation before the seal is formed tends to draw in air, which impairs the vacuum. After the sealing operation, the cam 124 raises the cam roller 122 and the hood 101 to cause the hood to clear the upper end of the container so that the sealed container may continue to follow the conveyor and the sealing head may move into position to pick up another closure.

It is generally desirable to have the containers pass out of the machine in the same direction that they come into the machine so that the containers will pass along a straight line. For this purpose a sprocket 25 is provided to engage the conveyor 1 and permit it to move outwardly in line with the entrance of the containers as shown more particularly in Figs. 1, 2, 8 and 21. The sprocket 25 engages the sides of the conveyor 1 about the pins 18 and operates in the same manner as the sprockets mounted about the head spacer and about the sealing mechanism. Any suitable mounting may be provided for the sprocket 25, but as shown in Fig. 8, a casting 165 is mounted on the machine base with a central recess 166 retaining a central cylindrical member 167 closed at its bottom. A hub 168 is mounted on suitable bushings to rotate about the cylindrical member 167. The sprocket 25 is bolted to the hub at 169. No drive for the sprocket is necessary as the conveyor is driven by the sprocket 24 extending about the sealing mechanism and the conveyor therefore drives the sprocket 25. A suitable cover 170 may be provided for covering the sprocket and suitable cover 171 may be provided for covering the upper end of the member 167. A rail 11c adjustable in position guides the containers in their movement with the conveyor. The outer side of the conveyor may be supported by a member 172 which is in turn supported by the pins 174 threaded at their lower ends to base member 165.

*Cap feed*

One embodiment of cap feed is illustrated more particularly in Figs. 1, 2, 7 and 10 to 16.

As shown in Figs. 2, 7 and 10 caps are presented to the sealing heads by means of a disk 179 having projections 179 which engage successive caps and slide them on the stationary disk 180 under a sealing head. In view of the fact that the closure is moving along the same path as the sealing head at the time it registers with the sealing head, the two are moved in substantially the same direction and at the same speed when the magnetized disk 127 of the sealing head picks up the closure. The angular position of the disk 179 may be adjusted by means of the slots 179a and the mounting bolts 179b (Figs. 2 and 10) to secure accurate registry of the closures and sealing heads.

There are some instances when containers may not be fed to the head spacer and to the sealing mechanism due to failure of supply or for other reasons. In such cases, it would be undesirable to have the magnetized disk pick up a closure as the next time the head came around, the closure thereon would be in the way. The present invention contemplates provision for preventing the picking up of a closure if a container is not available for receiving the closure. The construction for this purpose is shown more particularly in Figs. 2, 10 and 12. A feeler 184 is mounted adjacent the path of the containers (Figs. 2, 10 and 12) to be forced outwardly by a container as it moves past the feeler 184 in the star wheel 4 for the head spacer. The feeler 184 is carried by a member 186 which is slidably mounted in a guideway 187 covered by a member 188. A spring 189 pulls the member 186 so that the feeler 184 will move inwardly toward the star wheel 4 if a container is missing in the star wheel. The opposite end of the feeler is attached at 190 to rod 191. The rod 191 is attached at its other end to an arcuate arm 194 pivoted at 195. The arm 194 follows the contour of the path of the caps moved by the disk 178 when in the position shown in Fig. 10. In this position, it will be noted that a container is not present in the star wheel 4 at the point adjacent the feeler 184 and that the arm 194 will slide the caps off the sealing heads as they pass over it. This is shown in Fig. 10 where it will be seen that the sealing heads cross the free end of the arm 194 and hence the arm slides the closures off the head. On the other hand, when the member 184 has been forced out by a container in the star wheel, the rod 191 is forced out which swings the arm 194 into the position shown in Fig. 2. In that position, the free end of the arm 194 is not in the path of the closures and the magnetized disk 127 of the sealing head may pick up and carry away a closure. The arm 194 is held in ineffective position as long as containers continue to move through the star wheel of the head spacer seriatim. Thus, closures are fed only to those heads which later will receive a container for sealing. The closures which are wiped off of the magnetized pick-up disks 127 by the arm 194 pass on around through the cap feed as will be described later.

Any suitable means may be utilized for feeding the closures to the stationary disk 180 to be moved under the sealing heads by the rotary disk 179. For example, the closures could be fed by hand, but it is desirable to minimize the labor requirements and hence an automatic feed is preferred. One form of feed is illustrated in Figs. 10 to 15, in which the bottom cap is removed from a stack of caps by a slide member 200 (Fig. 13). The stack of closures may be retained in position by the upright rods 300 (Figs. 7 and 13). The upper ends of the rods may have a member 301 attached thereto to receive the end of a carton or tube containing a stack of closures packed therein as shown in Fig. 7 to facilitate transfer by closures from a carton to the cap feed. The slide member 200 may be in the form of that shown in Fig. 10 of the Harry E. Stover Patent No. 2,321,779, owned by the assignee of the present invention. The slide member has separator projections 201 which pass between the bottom two caps of the stack so that the bottom cap is separated from the stack as shown in Fig. 15 and the rest of the closures supported on the projections 201. This is accomplished by movement of the slide 200 to the right in Figs. 13 and 15. When the slide is moved to the left, the stack is dropped down to a lower level so that the bottom cap rests on the seat 203 of the slide 200 and in this position the members 201 may again engage between the two bottom caps of the stack.

The mechanism illustrated herein for oscillating the slide 200 back and forth may comprise a cylindrical member 205 having an upwardly extending portion 206 secured to the slide at 207 and having a portion 208 at its forward part riding upon a cam 209 (Figs. 11 and 13). The cylindrical member 205 is hollowed to receive a spring 211 held in position by a member 212 threaded into a member 214 which closes the end of the cylindrical member 205. Thus, with a suitable wrench the member 212 may be rotated to increase the compression in the spring 211. It will be noted that the slide 200 is moved to the right, which is the feeding stroke, under the influence of the spring 211 and is returned to the left under the positive action of the cam 209. Upon each rotation of the cam 209, the slide is oscillated to feed a cap. The angular position of the cam 209 with respect to shaft 214 and gear 215 may be changed by means of the adjustment 214a.

While a single cap feed may be sufficient in some instances, the speed at which the machine operates usually makes it desirable to have a plurality of cap feeds so that the slides or separator 200 may operate at a slower speed and be more reliable. Two cap feeds are illustrated herein, each a duplicate of the other and hence a description of one will suffice. These cap feeds are operated as shown more particularly in Fig. 12 by the cams 209 mounted on shafts 214 driven by gears 215 which in turn are driven by a gear 216 driven by the main drive gear 217 on shaft 218.

As pointed out above, in some instances, the closure is wiped from the sealing head and is returned to be passed to the cap feeds again. Where a cap is already in the dial, an additional cap would be unnecessary and objectionable. It is desirable therefore that the two cap separators feed caps only to those pockets which have no caps in them. For this purpose, automatic means are provided for preventing the slides 200 from moving to the right to feed a cap where a cap is already present in a pocket. The automatic means for each slide 200 may comprise a pin or latch member 220 (Figs. 12 and 16) which is adapted to engage back of the end of the cylinder 205 and prevent it from moving to the right under the influence of the spring 211. The pin 220 is normally held in ineffective position by means of a spring 221 mounted on its outer end and held in position by a nut 222 and bar 235 (Fig. 16).

Referring more particularly to Fig. 16 there is shown a feeler 225 in the path of the closures, as they enter beneath the cap separator, and this feeler operates the latch pin 220. It will be noted that the feeler 225 is pivotally mounted at 226 to swing upwardly with its opposite end 227 overlying the vertically slidable pin 228 mounted in bearing 229. The lower end of the pin rests upon the small bell crank 230 pivoted at 231 with its other end attached to a rod 232 slidable in a bearing 234. The opposite end of the rod 232 carries a cross member 235 attached to the pin 220. Springs 221 and 237 retain the cross member 235 and the pin 220 and rod 232 in their outer position. Thus, when a closure is present in a pocket which is about to move under a stack of caps, it raises the feeler 225 which in turn lowers the pin 228, rocks bell crank 230 and pulls the rod 232 to the left together with pin 220. This in turn causes the pin 220 to move in opposition to the spring 221 to latch the cylindrical member 205 against movement toward the right, hence a closure can not be fed until the feeler 225 is permitted to return to the position shown in Fig. 16. In this way closures are fed only to the pockets which do not have closures in them. Hence the two cap feeds may be mounted for feeding the same pockets and will feed only those pockets which have no caps in them.

As the sealing heads are raised and lowered for different heights of containers, it is desirable also to raise the disk 180 and the mechanism associated therewith for feeding the closures. The construction herein adapted to achieve this objective is shown more particularly in Figs. 7 and 11. A cylindrical member 242 threaded on its inside is rotatably mounted on a base 244 and meshes with members 245 threaded on their exterior and held against rotation by a member 243 bolted to the member 244. The members 245 may be integral with the cylindrical part 246a of the member 246. When the member 242 is rotated by means of the annular projection 247 the inner threaded members 245 and the member 246 are raised and they raise with them the associated parts. The disk 178 is secured to a hub member 249 which is rotated by the shaft 218. The plate member 180 is fixed to the member 246 by the bolts 181 and hence does not rotate. The shaft 214 on which the cam 209 is mounted carries a gear 215 meshing with the driven gear 216 for driving the same. The upper end of the shaft 214 may be mounted in the ball bearing 256. In this manner, the entire feeding mechanism may be raised or lowered by gripping the annular part 247 and rotating the member 242.

In the operation of the cap feed, closures are picked out of the pockets by means of the magnetized disks of the sealing heads provided a container is passing through the star wheel of the head spacer to be supplied to the sealing head for sealing. If no jar is present in the star wheel of the head spacer, the feeler member 184 (Fig. 10) is in the position shown and pulls through the lever 191 the arm 194 into the position shown to wipe the closure off of the magnetized disk of the sealing head. Suitable cap feeds are provided for automatically feeding caps from a stack to the pockets of a disk. The slide for separating the bottom cap from the stack is operated under the influence of the spring 211 and returned by the positive action of the cam 209 (Figs. 12 and 13). If a closure is already in the pocket, the feeler 225 is raised by the closure in the pocket, which in turn operates the latch member 220 through the intermediation of pin 228, bell crank 230, rod 232 and cross member 235 attached to the latch member 220. In this way, the cap feed is rendered ineffective during the period that a pocket passes with a closure in it.

Closures are therefore fed to each empty pocket as it passes, and the disk 178 with the members 179 thereon move the closures into registry with the disk of the sealing head which picks the closures up magnetically if a container has been fed for sealing by said sealing head.

It will be understood that other types of closure feeds may be utilized and also other types of automatic controls therefor. For example, a second embodiment of cap feed and control therefor, illustrated in Figs. 29 to 31 may be utilized. The construction therein embodies a mechanism for removing closures from the bottom of the stack which may be substituted for the one described above and may be automatically controlled by the devices described above or responsively to the feed of containers as illustrated in Fig. 32.

Referring more particularly to Figs. 29 to 32 and comparing those figures with Figs. 2, 10, and 11 described above, it will be noted that the aperture 207' in the base member 340 of the cap feed fits over the pin or mounting member 207 which holds the base in position. Likewise the aperture 206' in the slide 200' fits over the pin 206 which is reciprocated back and forth as described in the first embodiment. Thus the base member 340 is held in position by the mounting member or pin 207 and the slide 200' is reciprocated back and forth by the pin 206 which is operated by the cylindrical member 205 and cam 209 shown in Fig. 11.

The second embodiment of cap feed shown in Figs. 29 to 32 differs from the first primarily in the means for separating the bottom cap from the stack. Referring more particularly to Figs. 29 and 30 the stack of caps is held in position by four rods 300 over an aperture 341 in a base member 340. The bottom of the stack is supported by four rotary separators in the form of disks 342. These disks have their outer peripheral surfaces shaped to support the stack of caps at all times. Upon oscillation of the disks the support of the bottom cap in the stack is released while the cap next to the bottom is engaged and supported, thus permitting the bottom cap to be dropped or fed. The disk surface construction for this purpose is shown more particularly in Figs. 30 and 31. Each disk has a peripheral surface projection or tongue 344 adapted to slide between the bottom two caps and to support the next to the bottom cap. Each of the disks also has a peripheral projection or ledge 345 adapted to support the bottom cap. A spiral groove 346 extends between the tongue and ledge to permit the release of the bottom cap. Normally the ledges 345 support the bottom of the stack as shown in Fig. 29. When the disks are rotated in the direction of the arrows shown in Fig. 31 the ledges 345 are moved out from under the bottom of the stack and simultaneously the tongues 344 pass between the two bottom caps and support the stack. The bottom cap is forced out or released by the spiral grooves 346 as the rotation of the disks is continued. At the same time the tongues 344 are withdrawn and the stack of caps drops again on the ledge 345 ready for a succeeding feeding operation, when the rotation is reversed.

The mechanism for oscillating the separating disks 342 is shown more particularly in Figs. 29 and 30. As described above the slide 200' is oscillated by the pin 206 in the aperture 206'. The legs of the slide fit into guideways 348 and have rack teeth 349 meshing with gears 350 on pinions 351. Each of the four pinions 351 has mounted on its lower end one of the separating disks 342. Thus each time the slide 200' is reciprocated by the pin 206 the pinions 351 and the separating disks 342 thereon are oscillated to feed a cap from the bottom of the stack. Thus the cap separator illustrated in Figs. 29 to 31 may be substituted for the first embodiment of cap separator without changing the cap feed drive.

The automatic control described with reference to the first embodiment of cap feed is equally effective as that control prevents the reciprocation of the pin 206 when a cap is in a pocket 179 of the disk 178 (Fig. 11). Hence this construction may be substituted for the feeds described in the first embodiment.

If desired both the cap feed of the first embodiment and the cap feed of the second embodiment now being described may be controlled responsively to the feed of containers. This is achieved by making the rod 232' responsive to the feed of containers instead of responsive to the feed of closures as described in the first embodiment. A construction for this purpose is illustrated in Fig. 32. A rod 232' corresponding to the rod 232 in the first embodiment is elongated and connected at its end to an arm 352 keyed to a shaft 354 mounted on the framework of the machine and having an arm 355 keyed thereto. The purpose of having two arms instead of a bell crank is to take care of the different elevations of the rod 232' and the rod 356. The rod 356 is pivotally connected to the arm 355 and to another arm 357. The arm 357 is keyed to a shaft 358 having an arm 359 keyed to its other end and pivotally connected to a rod 360. The opposite end of rod 360 is pivotally connected to one arm of a bell crank 361 pivoted at 362 with the opposite arm 364 of the bell crank projecting into the path of the containers in the star wheel of the head spacer. The passing container forces the feeler or arm 364 of the bell crank outwardly which pulls the rods 360 and 356 to the left which in turn forces the rod 232' to the right and the pin 220 (Fig. 16) out of latching position to permit the continuous reciprocation of the slide 200'. The cap and container feeds are synchronized so that for each container passing through the star wheel a closure is fed to a pocket of the disc 178'. A spring 365 held by a stop 366 on rod 232' may be utilized to force the rod 232' to the left and to retain the feeler 364 in the path of the container. This spring 365 may be substituted for the springs 221 and 237 (Fig. 16) or may be stronger than those springs and used in conjunction with them.

When a container fails to be fed to the star wheel of the head spacer, the feeler 364 is forced by the spring 366 into the space left by the absent container. This permits the rod 232' to move to the left which forces the pin 220 (Fig. 16) into the path of the cylinder 205 and prevents the slide 200' from moving inwardly to operate the disk 342 (Fig. 30) for feeding a closure. Thus closures will be fed only when a container is fed to the sealing mechanism. It will be understood that the number of pockets in the disk 178 is such that each closure fed is applied to the container in front of the feeler 364 at the time the closure is fed.

A preferred embodiment of cap feed is illustrated in Figs. 33 to 37. In the form illustrated the cap feed is driven from the vertical shaft 31 (Fig. 9) which drives the helicoid. This simplifies the connection of the parts, and the required changes in construction described herein for adjustably supporting the preferred embodiment of cap feed. Parts which correspond substantially to similar parts described hereinbefore are given similar numbers and differentiated by the use of primes.

The rotary cap separating mechanism illustrated more particularly in Fig. 33B is claimed in a co-pending application of Harry E. Stover, Serial No. 118,802, owned by the assignee of the present application.

Referring more particularly to Fig. 33 which corresponds generally to Fig. 11, it will be noted that this third and preferred embodiment of cap feed is mounted upon a base 244 of the machine and has a cylindrical member 242' with threads on its interior meshing with threads 245' on the outer surface of the cylindrical portion of the supporting member 246', which has an upper part adapted to receive and support the plate 180' having the disk 178' with pockets 179' therein for receiving closures from the cap feed and delivering them to the sealing heads respectively. The disk 178', driven by shaft 218', and associated parts may be raised and lowered by gripping the annular part 247' to rotate the part 242'.

The preferred embodiment of cap feed now being described is adapted to supply closure caps to the pockets of the disk 178' responsive to the feed of containers to the sealing machine. In view of the fact that the cap feed is operated by a continuous drive for rotating the cap separator, the separating mechanism will be described at this point and the drive and mounting, which are closely related, will be described later.

Referring again to Fig. 33 the stack of caps is retained in position by two or more rods 300', mounted in the base of the feed and preferably inclined about 25° from the vertical. The rods 300' are fixed in position about a cylindrical recess 360 in a base member 361. A stack of caps may be delivered to the rods 300' with the lowermost caps of the stack in the recess 360. By reason of the inclination of the stack the bottom cap is likewise inclined to the supporting plate 180' and is over the path of the pockets in the disk 178'.

The mechanism for separating the lowermost cap from the stack and delivering it to a pocket in the disk 178' comprises a rotary member 364 (Figs. 33 and 33A) preferably made in two parts for convenience in manufacturing. The bottom part 365 (Fig. 33A) has a spiral peripheral groove 366 for forcing the tilted side of the bottom cap downwardly. The upper part 367 has a tongue 368 for engaging between two bottom caps and separating the next to the bottom cap from the stack. A cam surface 369 below the tongue 368 leads to the upper side of the groove 366 to force the cap into the groove. A cam surface 370 spaced peripherally from the tongue 368 permits the stack of caps to ride down so that the bottom cap is in the recess below the tongue 368. The two parts 365 and 367 may be dowelled together to serve as a single element. It is to be noted also, that the bottom part 365 is conical in shape so that the closure, as it drops about its fixed point, is continuously engaged by the groove 366 to force it down into a pocket 179' of the disk.

It has been found that this simple feed operated by the continuous rotation of the rotary member 364 will feed closures at a rate of five hundred or more a minute. A rapid feed of this type is particularly desirable where the sealing machine is operated with a dual action sealing head for sealing small sizes of containers. The member 364 may be rotated in any desired manner. As shown herein a spiral gear 371 is keyed to shaft 372 to which the part 364 is keyed at its opposite end. The gear 371 may be driven by a meshing spiral gear 374 on shaft 375 as will be described in greater detail later.

As pointed out above an automatic control for the cap feed is desirable in order to prevent the feed of closures when a container is not fed or when the feed of containers has been stopped. To achieve this object a slide 377 (Fig. 33) is provided having a slot 378 fitting about the shaft 372 and the upper end 374 of the rotary part 367. The slot 378 permits the slide 377 to be reciprocated a slight distance. The lower end of the slide has a latch surface 379 which may be projected beneath the edge of the bottom cap in the stack. When so projected, the latch 379 prevents the feed of closures and renders the operation of the cap separating member 367 ineffective. The slide 377 is operated by means of the arm 380 having one end fitting into a recess 381 in the slide 377 and the other end keyed to shaft 382.

The shaft 382 is mounted in suitable bearings and operated responsively to the feed of the containers by means of a feeler 384 (Fig. 34) in the path of the containers passing the helicoid feed therefor. The feeler is operatively connected to the shaft 382 through the intermediation of a shaft 385 to which the feeler is keyed, arm 386 also keyed to the shaft 385, rod 387, slidably mounted in a housing 388 and pivotally connected at one end to arm 386 and at its other end to an arm 390 keyed to the shaft 391, and rod 392 operatively connected at one end to arm 394 keyed to shaft 391 and its other end to an arm on shaft 382. The rod 392 may be adjustable in length by means of the sleeve 393.

Thus, as containers continue to pass along the helicoid the feeler 384 is maintained in the position shown in Fig. 34. This retains the rod 387 pressed toward the right of Fig. 34 and the rod 392 forced downwardly, which in turn through the intermediation of shaft 382 retains the slide 377 in retracted position so that the latch part 379 at the lower end thereof is out of engagement with the caps in the stack. When a container fails to engage the feeler 384, a spring 395 effective upon the arm 390 pulls the rod 387 to the left (Fig. 34) and forces rod 392 upward to rotate the shaft 382 and to project the slide 377 downwardly so that its latch edge 379 engages under the bottom closure of the stack to render the cap feed ineffective. Thus, when a container fails to pass and depress the feeler, the cap feed does not feed a closure. The number of pockets in the disk 178' is such that the pocket not having a closure fed to it, eventually registers with the sealing head for which no container has been fed. Closures are therefore, fed only to those heads which receive containers. If by any chance a closure is fed to a head which does not receive a container, there is provided a member for wiping off any closures which are on sealing disks, prior to their presentation to the closure feed.

The mounting and drive for the preferred embodiment of cap feed is shown more particularly in Figs. 36 and 37. The vertical shaft 31 shown in Fig. 9 for driving the helicoid is extended upwardly to drive the preferred embodiment of cap feed and is numbered 31' in Fig. 36. A casting 400 fits over the shaft and over the bearing sleeve 401 keyed to the shaft 31'. The upper end of the casing 400 has a cover 402 recessed at 404 to receive the upper end of the sleeve 401. Gear 405 is fixed to the sleeve 401 and meshes with a gear 406 on shaft 407. The gear 406 meshes with gear 408 on shaft 409 extending longitudinally in a housing 410. The gears 405, 406 and 408 are preferably of the 45° spiral type. The gear 408 is operatively connected to the shaft 375 by means of a sleeve 411 slidably keyed thereto by a pin 412 in slot 414. The sleeve 411 is held against the gear 408 by means of a spring 415 and connects with the gear 408 by means of a projection 416 fitting into the V-shaped notch in the edge of the gear 408. The purpose of this connection is to permit the sleeve 411 to disengage the gear in the event that the parts jam and thereby avoid damage to the cap feed. The spiral gear 374 for driving the cap feed is keyed to one end of a sleeve 417 on the shaft 375 (Fig. 37) which in turn is keyed to an annular member 418 at its other end. The shaft 375 has a member 419 keyed thereto at its end to engage the member 418. By loosening the nut 420 the engaging surfaces, which are preferably knurled to prevent slippage, between the annular members 418 and 419 may be released and the shaft 375 and sleeve 417 rotated independently of each other. In this way the relation of the gear 345 to the shaft 374 may be adjusted to have the cap separator operating in proper timed relation with respect to the cap pockets 179'. A suitable cap 421 may be threaded over the end of the shaft 375 and over the parts for making the adjustment described.

Thus rotation of the shaft 31' (Fig. 36), which operates the helicoid, also operates the cap feed through the intermediation of sleeve 401, gear 405 thereon, gear 406 on shaft 407, gear 408 on shaft 375, annular member 419 on the opposite end of shaft 375, member 418 keyed to the sleeve 417, gear 374 fixed to sleeve 417, and gear 371 keyed to shaft 372 carrying the cap feeding member 364.

It is sometimes desirable to have access to the bottom of the stack of caps located in the recess 360. The mounting is designed to achieve this result conveniently. The entire cap feed is pivotally mounted about the shaft 31' so that it may be swung about it as a pivot. The cap feed is held in position by means of a wing nut 422 (Fig. 34) fitting in a slot 424. By loosening the wing nut the cap feed may be swung around the shaft 31' as a pivot. To further facilitate access to the cap feed, the mounting on shaft 31' is slidably keyed so that the head 400 may be raised which in turn raises the cap feed parts also. To make this raising operation automatic a cam 425 (Fig. 35) is provided which raises the cap feed as it is swung about its pivot. The swinging of the cap feed will of course force the rod 392 of the automatic control downwardly with reference to Fig. 34 but that merely swings the feeler 384 away from the containers. Hence the cap feed control does not interfere with the swinging movement. This third embodiment of cap feed is preferred by reason of its flexibility and ready access to the closure feeding parts and particularly because of the high speed at which it may be operated.

In some instances, it may be desirable to feed the closures from a hopper. For this purpose, a hopper 240 is shown in Fig. 24 with a chute or guideway 241 along which the closures pass from the hopper. The closures at the end of the chute may be picked up by the rotary disk 179 and presented to the sealing heads as shown in Fig. 24. Where a pocket already has a closure in it, no further closure would be fed to it.

*Drive*

Any suitable drive may be provided for the machine. As illustrated herein, the conveyor is driven from the sprocket 24 mounted on the sealing mechanism. As illustrated in Fig. 9 the sealing mechanism is driven by a gear 81 meshing with an idling gear 84 on shaft 85 which in turn meshes with the gear 86 on drive shaft 31. The drive shaft 31 is connected to a reduction gear 32 which in turn is driven by a pulley 30. The speed of the machine may be visually indicated by a speedometer 33 operatively connected to the shaft of the pulley 30 by means of a flexible shaft 33a. The pulley 30 is driven by a belt 255 which is preferably of the V-type and extends over a driving pulley 256 on the motor shaft 257 of an electric motor 258. The motor may be slidably mounted on a suitable base 259 in the base of the sealing machine. The pulley 256 is adapted to be adjusted by rotation of the hand wheel 260. The motor 258 together with the pulley 256 may be moved to tighten or loosen the belt 255 by means of the crank 262 on the horizontal shaft 264, said shaft is operatively connected with the vertical shaft 265 at 266, which is turn is connected with a horizontal shaft 267 at 268 operatively connected to slide the motor back and forth for changing the speed of the drive without changing the speed of the motor. Such variable speed drives are in common use and a further detailed description thereof is not necessary. The motor may also be a variable speed motor, if desired. The drive shown is illustrative of the preferred form with the understanding that various other types of variable speed drives, either mechanical or electrical, may be utilized.

*Operation*

In the operation of the machine, containers are placed on the conveyor 1 at the left side of the machine as shown in Fig. 2 either singly or in groups. The containers reach the helicoid 2 and the resiliently mounted sectional guide rail 38 which cooperate to space the containers a given distance on the conveyor. The containers, as they leave the helicoid, register with and are forced into the spaces provided therefor in the star wheel 4 of the head spacer. The guide rails 74 which are adjustable in position hold the containers snugly in position. As each container passes the head spacer, one of the displacing disks 65 thereon (Fig. 6) registers with the container and the cam 58 permits the head to drop down under the influence of the spring 71 so that the disk 65 enters the mouth of the container and displaces any excess contents of overfilled containers. At the same time, the disk 66 engages the rim of the container and wipes it off. The disk 66 is rotated by means of the gear 57 thereon rolling on the stationary gear 56 of the head spacer. Thus as each container passes the head spacer, excess contents are removed and at the same time the rim of the container is wiped to prevent impairment of the sealing operation.

As the container leaves the head spacer, it passes into the sealing unit (Figs. 2 and 7). The guide rail 74a forces the containers snugly into star wheel 6 of the sealing mechanism which corresponds to the star 4 of the head spacer. One of the sealing heads 7 with a closure magnetically held on the disk 127 therein, registers with the container. As the container and sealing head move along together, the hood 101 of the sealing head is permitted to drop down by a cam roller 122 running along the cam 124 so that the hood encloses the upper end of the container. At this point, steam is admitted to the sealing head through an inverted U-shaped conduit 116 having one end attached to an arcuate steam channel 120 supplied with steam from the conduit 121 so that steam is supplied to the sealing head for a substantial part of the movement about the sealing mechanism. A suitable drain may be provided at the lower end of the conduit 116 to remove any condensate. Thus, steam may be supplied to the sealing head and pass between the closure and container for a substantial part of the movement about the sealing mechanism. As a sealing head reaches the roller 140 as shown in Fig. 7, the disk 127 of the sealing head is forced downwardly by the roller 140 to apply the cap to the container. The roller 140 is held in its lower position by a bell crank 141 and the spring 148 effective upon one end thereof, hence the pressure applied may be regulated by increasing the compression on the spring 148. The machine is suitable for various types of seals; for example, vapor sealing may be obtained as described above or a vacuum seal may be obtained by connecting the conduit 121 to a vacuum and using a sealing head similar to that shown in Fig. 19. The containers may be sealed with an inert gas therein by connecting the conduit 121 to a supply of inert gas and utilizing the preferred form of the invention. The inert gas could be supplied to the tank 324 in Fig. 7.

As the containers leave the sealing mechanism, they continue with the conveyor about the sprocket 25 as they leave the machine. It will be noted that the conveyor 1 moves about the sprockets 22, 24 and 25 to pass about the head spacer, the sealing mechanism and sprocket 25. The containers are diverted from the straight line movement into their substantially U-shaped path by these sprockets. The sprocket 24 is driven by the main drive shaft and serves to drive the conveyor as an entirety.

Closures are fed to the machine by a rotating disk 178 (Figs. 2 and 10) having projections 179 thereon for positioning closures under the sealing heads as the sealing heads pass above them. If, for some reason, a container has not been fed to be sealed by a sealing head, the closure for the sealing head is wiped off of the disk 127 therein as it attempts to pick it up magnetically. The mechanism for this purpose is shown more particularly in Figs. 10 and 12 where an arm or feeler 184 is normally held in its inner position in opposition to spring 189 by the passing containers in the star wheel 4 of the head spacer. When a container is not present, the spring 189 forces the member 184 outward, which in turn operates the pivoted arm 194 by means of a lever 191 to swing the arm 194 into the path of the closure raised by the magnetized disk 127 in a sealing head and hence wipes the closure off the disk.

The feeding means for delivering closures one at a time to the pockets in the disk 178 comprises a pair of feeding devices in the form of slides for removing the bottom closures from stacks. The operation of the slides is shown more particularly in Figs. 10 to 15. The slide 200 is operatively connected to a cylindrical member 205 which is moved to the left by a cam 209 and is moved to the right under the influence of the spring 211 (Fig. 12). In order to prevent the closure feed devices from feeding closures to pockets having closures therein, a feeler 225 (Fig. 16) is provided which is operatively connected to a latch member 220 through the intermediation of the arm 227, pin 228, bell crank 230, rod 232, cross member 235, and pin 220. When a closure raises the feeler 225, the pin 220 is forced inwardly to serve as a latch to prevent movement to the right of the cylindrical member 205 which moves the slide 200 to the right for feeding the bottom cap in the stack. The speed of the machine may be regulated by means of a variable speed drive shown in Fig. 8. The height of the head spacer may be regulated by means of hand wheel 59 (Fig. 6) and the height of the sealing heads may be regulated by means of the hand wheel 150 (Fig. 7). Likewise, the closure feed may be raised or lowered by means of a member 247 (Fig. 11). Thus the parts may be readily adjusted for various heights of containers. The conveyor passes along all the various parts of the machine and hence the containers do not have to be moved from one conveyor to another, which frequently causes the contents to spill or the containers to topple over. Since the conveyor is operatively connected to both the head spacer and to the sealing mechanism, accurate registry is assured.

It will be seen that the present invention provides an improved sealing machine and method for obtaining a high vacuum in containers at the rate of several hundred seals a minute. The containers are under positive control during the passage through the machine and hence toppling or spilling is reduced to a minimum. Vacuum, steam or inert gases may be applied to the containers for a substantial period of time to obtain the most effective action. The machine is simple in construction, readily adjustable for various sizes and shapes of containers and fully capable of withstanding the rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a sealing machine, the combination of a rotary sealing mechanism, a continuous conveyor, a rotary head spacer for removing excess contents from overfilled containers prior to their entering the sealing mechanism, a pair of sprockets mounted to rotate in a vertical plane, a sprocket on said head spacer around which the conveyor carries containers, another sprocket on said sealing mechanism, the latter two sprockets being rotatable in a horizontal plane, said conveyor adapted to pass about said vertical sprockets idly and carrying containers around said horizontal sprockets.

2. In a sealing machine, the combination of a rotary sealing mechanism, a rotary head spacer for removing excess contents from overfilled containers prior to their entering the sealing mechanism, a pair of sprockets mounted to rotate in a vertical plane, a sprocket on said head spacer and another sprocket on said sealing mechanism, the latter two sprockets being rotatable in a horizontal plane and a conveyor adapted to pass about said vertical sprockets and said horizontal sprockets, said sprocket on the rotary sealing mechanism being fixed thereto and rotatable therewith to drive the conveyor.

3. In a sealing machine, the combination of a rotary head spacer for removing the contents of overfilled containers prior to their reaching a sealing mechanism, a rotary sealing mechanism for sealing containers, a sprocket mounted about said head spacer and fixed to rotate therewith, and a sprocket mounted about said rotary sealing mechanism fixed thereto and rotatable therewith, a conveyor for conveying containers mounted to pass about a portion of the sprocket on the head spacer and a portion of the sprocket on the rotary sealing mechanism, whereby the containers on the conveyor are accurately positioned with respect to the head spacer and with respect to the sealing mechanism.

4. In a sealing machine, the combination of a pair of end sprockets rotatable in a substantially vertical plane, a rotary sealing mechanism having a sprocket fixed thereto rotatable in a substantially horizontal plane, a conveyor flexible in vertical and horizontal planes mounted on said end sprockets and extending laterally about the sprocket on said rotary sealing mechanism, a rotatable head spacer intermediate one of said end sprockets and said sprocket on the sealing mechanism having a sprocket thereon adapted to rotate therewith, said sprocket engaging the conveyor to cause it to pass a greater distance around said sealing mechanism sprocket and an idling sprocket rotatable in a horizontal plane intermediate the sealing mechanism and the other end sprocket likewise to engage the conveyor and force it laterally inwardly toward the sealing machine sprocket.

5. In a machine for sealing closures to containers, the combination of a rotary turret having sealing heads thereon, means for feeding closures to said heads, a link conveyor, a sprocket mounted on said rotary turret for moving said link conveyor to convey containers about said turret, a star wheel mounted on the turret and rotatably with said sprocket for holding the container in position on the conveyor and means for preventing relative rotation between said turret and said star wheel, whereby said turret, star wheel and conveyor sprocket rotate as a unit.

6. In a machine for sealing closures to containers, the combination of a rotary turret having sealing heads thereon, means for feeding closures to said heads, a link conveyor, a sprocket mounted to rotate about the axis of said rotary turret for moving said link conveyor to convey containers under said sealing heads, a star wheel mounted on the turret and rotatable with said sprocket for holding the containers in position on the conveyor, a plurality of pins for slidably connecting said star wheel to said turret and for preventing relative rotation therebetween, whereby said turret, star wheel and conveyor rotate as a unit and means for moving said turret and the sealing heads thereon vertically with respect to said star wheel to adjust the machine for sealing containers of different heights.

7. In a sealing machine, the combination of a vertical column, a hub mounted about the lower portion of said column, a sprocket fixed to said hub, a conveyor meshing with said sprocket for conveying containers in a substantially circular path about said column, a star wheel fixed to said hub for positioning containers on said conveyor, a turret mounted about said hub having a plurality of sealing heads thereon, means for feeding closures to said sealing heads, and means for preventing relative rotation between said star wheel and said turret whereby said turret, star wheel and sprocket rotate as a unit.

8. In a sealing machine, the combination of a vertical column, a hub mounted about the lower portion of said column, a sprocket fixed to said hub, a conveyor meshing with said sprocket for conveying containers in a substantially circular path about said column, a star wheel fixed to said hub for positioning containers on said conveyor, a turret mounted about said hub having a plurality of sealing heads thereon, means for preventing relative rotation between said star wheel and said turret whereby said turret, star wheel and sprocket rotate as a unit, each of said sealing heads having a hood adapted to enclose the upper end of a container, means for supplying a fluid to the hood and over the rim of the container during the movement of the sealing head and the container about the column and means within the hood for supporting a closure spaced from the mouth of the container and for sealing the closure on the container.

9. In a sealing machine, the combination of a central column, a hub mounted about the lower portion of said column, a sprocket fixed to said hub, a conveyor on said sprocket for moving containers about the column, a star wheel fixed to said hub for positioning containers on the conveyor, a turret mounted above said hub having a plurality of sealing heads thereon, means connecting the turret and hub to rotate them at the same speed, each of said sealing heads having a hood adapted to extend over and enclose the upper end of the container, a cam for raising and lowering said hoods as the turret rotates, means for supplying a fluid to each hood and for directing it over the upper end of the container therein, and means within each hood for supporting a closure above the mouth of a container and for sealing a closure on the container.

10. In a sealing machine, the combination of a vertical column, a hub at the lower portion of said column, a sprocket fixed to said hub, a conveyor on said sprocket, a star wheel fixed to said hub above the sprocket for positioning containers on the conveyor, a turret mounted about said column above said hub, pins slidably connecting said turret to said star wheel for rotating said turret with the star wheel, a plurality of sealing heads on said turret, each of said sealing heads having a hood adapted to extend about a container to enclose the upper end thereof, conduits connecting each hood with an arcuate port for changing the conditions within the hood, and means within each hood for supporting a closure spaced from a container and for sealing the closure on the container.

11. In a sealing machine, the combination of a vertical column, a hub at the lower portion of said column, a sprocket fixed to said hub, a conveyor on said sprocket, a star wheel fixed to said hub above the sprocket for positioning containers on the conveyor, a turret mounted about said column above said hub, pins slidably connecting said turret with respect to said star wheel for rotating said turret with the star wheel, a plurality of sealing heads on said turret, each of said sealing heads having a hood adapted to extend about a container to enclose the upper end thereof, conduits connecting each hood with an arcuate port for changing the conditions within the hood, means within each hood for supporting a closure spaced from a container and for sealing the closure on the container, and a gasket at the bottom of each hood for engaging a shoulder on a container to form a seal between the container and the hood.

12. In a head spacing and sealing mechanism, the combination with a conveyor, of a column, a sprocket thereon engaging the conveyor around which the conveyor carries containers, a turret on said column turning with said sprocket and including means to displace any excess contents of the containers, a second column, a sprocket thereon engaging the conveyor around which the conveyor carries containers, a turret on said second column turning with the sprocket and including devices adapted to apply closures to the containers, a rotating closure feeding table overlapping the paths of the applying devices and carrying individual closures beneath the applying devices, means for transferring the closures from the table to the applying devices, and means for operating the applying devices to apply the closures.

13. In a sealing machine, the combination of a turret having a plurality of sealing heads thereon, for sealing closures to containers each of said heads having a member for picking up and supporting a closure cap therein, means for presenting caps beneath said members respectively, and means comprising a movable wiper and a container engaging element responsive to the containers moving toward said sealing heads for causing the wiper to remove the closure from the member of a sealing head when a container has not been fed for sealing by said sealing head.

14. In a sealing machine, the combination of a turret having a plurality of sealing heads thereon for sealing closures to containers, each of said sealing heads having a member for picking up and supporting a closure cap therein, an arm for removing closures from said member, means for presenting closures beneath said members respectively and means responsive to the containers moving toward said sealing heads for moving said arm into the path of the closures on said members to wipe the closure from the member of a sealing head when a container has not been presented for sealing by said sealing head.

15. In head spacer, the combination of a rotary turret having a plurality of spacer heads thereon, each of said spacer heads being rotatably mounted on the turret and having a member adapted to enter the mouth of a container to displace excess material from overfilled containers, a wiping disk mounted on said member to engage the rim of the container and means for continuously rotating said member about its axis to wipe the rim of the container.

16. In head spacer, the combination of a column, a hub rotatably mounted about said column, a sprocket fixed to said hub, a conveyor on said sprocket for conveying containers about said column, a star wheel fixed to said hub for positioning containers on the conveyor, a turret mounted above said hub about said column having a plurality of head spacers thereon and means for preventing rotary movement between said star wheel and said turret so that said sprocket, star wheel and turret rotate as a unit.

17. In a sealing machine, the combination of a rotary sealing mechanism having a plurality of spaced sealing heads thereon for sealing closures to containers, means for feeding closures to said sealing heads, a shaft about which said sealing heads rotate, a star wheel for feeding containers in proper spaced relation to said sealing heads, said star wheel comprising a central member adapted to rotate about said shaft, a pair of upper disks and a pair of lower disks with recesses in their outer peripheries mounted about the periphery of said central member, one each of said pair of upper and lower disks being adapted to rotate with respect to the other disk and with respect to the central member, and means for rotating said rotatable disks to vary the size of the recesses in said star wheels.

18. In a machine for sealing containers substantially filled with a product, a container carrier traveling at substantially constant speed in an arcuate path around the vertical axis of said sealing machine and supporting and moving a series of regularly spaced containers in said path, means for directing steam across the tops of the said containers during a substantial part of their travel in said arcuate path, a series of closure supporting heads, means for moving said heads horizontally at constant speed in said arcuate path around said vertical axis and carrying, independently of the containers, horizontally positioned closures in said steam swept spaces above said containers and in vertical alignment with the respective containers, and means for vertically lowering each of said closure supporting heads with its horizontally positioned closure in succession through said steam and onto the top of the container to hermetically seal the container and to displace air and trap steam between the closure and the contained product.

19. In a machine for sealing closures to containers, the combination of a rotary turret having sealing heads thereon, means for feeding closures to said heads, a sprocket below said sealing heads and mounted to rotate about the axis of the turret, a laterally flexible conveyor passing about said sprocket to carry containers, a star wheel below said sealing heads and above said sprocket and mounted to rotate about the axis of the turret for positioning containers on said conveyor beneath said sealing heads, said turret and said star wheel being vertically movable with respect to each other, means for preventing relative rotary movement therebetween and for driving said turret from said star wheel, and means for raising and lowering said turret with respect to said star wheel to accommodate containers of different heights.

20. The combination with a conveyor, of a sprocket about which it travels, said sprocket being mounted to rotate about a vertical axis, a turret above said sprocket mounted to rotate about said vertical axis and including devices to seal closures to the tops of successive containers carried by the conveyor, means for feeding closures for application to the containers, an outer guard against which the containers press as they travel under the turret, and a star wheel above the sprocket turning with the sprocket and including adjustably spaced teeth to hold varied sizes of containers in desired spacing against said guard.

21. The combination with a conveyor, of a sprocket about which it travels, said sprocket being mounted to rotate about a vertical axis, a turret above said sprocket mounted to rotate about said vertical axis and including devices to seal closures to the tops of successive containers carried by the conveyor, means for feeding closures for application to the containers, an outer guard against which the containers press as they travel under the turret and adjustable to bring the upper ends of containers centrally under the devices and a star wheel above the sprocket turning with the sprocket including teeth to hold the containers in desired spaced relation against the guard.

22. In a sealing machine, the combination of a central column, a cylindrical member telescoped about said column and keyed thereto, a turret mounted upon said cylindrical member to rotate thereabout, a plurality of sealing heads mounted on said turret for sealing closures to containers, said heads including hoods for enclosing the upper ends of the containers, a second cylindrical member operatively connected to the first cylindrical member and extending about said first cylindrical member and having a cam thereon above said turret co-operating with each sealing head for raising and lowering the hood thereof, and adjusting means operatively connecting said column with said first cylindrical member to raise said first cylindrical member with respect to said column together with said turret and said second cylindrical member to accommodate containers of different heights.

23. The method of sealing a container substantially filled with a product comprising continuously moving said container and an independently supported closure, co-axial with and spaced horizontally above the container, both at substantially the same speed in an arcuate path around a vertical axis along which arcuate path steam supplying and sealing stations are located, supplying steam at the steam supplying station to the space between the closure and the container during a substantial part of said arcuate movement, and moving said horizontally positioned closure downwardly through said steam to seal the closure on the container at the sealing station while the closure and container are continuing said movement in said arcuate path about said vertical axis and while continuing said supplying of steam, thereby to displace air and trap steam in the space between the closure and the product prior to and at the time of the sealing operation while continuing the said movement of the container.

24. The method of sealing a container substantially filled with a product comprising continuously moving said container and an independently supported closure, co-axial with and spaced horizontally above the container, both at substantially the same speed in an arcuate path around a vertical axis along which arcuate path steam supplying and sealing stations are located, directing steam at the steam supplying station to the space between the closure and the container during a substantial part of said arcuate movement, husbanding the steam about the upper end of the container moving in said arcuate path, and bringing said container and horizontally positioned closure together through said steam to seal the closure on the container at the sealing station while the closure and container are continuing said movement together in said arcuate path about said vertical axis and while continuing said supplying of steam, thereby to displace air and trap steam in the space between the closure and the product prior to and at the time of the sealing operation while continuing the said movement of the container.

25. In a sealing machine of the class described, the combination of a turret mounted to rotate about the vertical axis of the sealing machine, means for continuously moving a container in an arcuate path about said vertical axis of the sealing machine, means on said turret for supporting a closure independently of the container, spaced above and out of contact with the container during said movement, means for continuously rotating said turret with the closure supporting means thereon while maintaining the closure in vertical registry with the container in said arcuate path, devices for directing steam to the space between the closure and the container during a substantial part of their continuous movement in said arcuate path about said vertical axis, and means for forcing said closure supporting means downwardly to carry said closure downward through said steam to hermetically seal the closure to the container during the movement of the container and closure horizontally in said arcuate path about said vertical axis of the sealing machine while continuing said directing of steam.

26. In a sealing machine of the class described, the combination of a turret mounted to rotate about the vertical axis of the sealing machine, a laterally flexible conveyor for a container, means for moving the conveyor at a substantially constant speed in an arcuate path about said vertical axis, means on the turret for supporting a closure above the container on said conveyor in registry and out of contact with the container, means for continuously rotating said turret to move said supporting means at the speed of the conveyor, devices for directing steam between the closure and container during a substantial part of their continuous movement in said arcuate path, and means for forcing said closure supporting means downwardly to carry said closure downward through said steam to hermetically seal the closure to the container during the movement of the container and closure in said arcuate path about the vertical axis of the sealing machine and while directing steam between the closure and container until prevented by the hermetic sealing of the closure to the container.

27. In a sealing machine of the class described, the combination of a laterally flexible conveyor for a container, means for moving the conveyor in an arcuate path about an upright axis of the sealing machine, means for supporting a closure spaced above the container on the conveyor in registry and out of contact with the container during its movement about the upright axis of the sealing machine, means for continuously moving said supporting means at the speed of the conveyor, a hood adapted to move downwardly over said closure and over the upper end of said container, devices within said hood for receiving and directing steam to the space between the closure and the container during a substantial part of their movement in said arcuate path, and means for forcing said closure supporting means downwardly to carry said closure downward through said steam to hermetically seal the closure to the container during movement of the container and closure in said arcuate path about the vertical axis of the sealing machine and while directing steam between the closure and container until prevented by the hermetic sealing of the closure to the container.

28. In a sealing machine of the class described, the combination of means for continuously moving containers at a substantially constant speed in an arcuate path about the vertical axis of the sealing machine, a plurality of magnetic devices for picking up closures successively by engagement with the upper surfaces thereof and supporting closures above and independently of the moving containers and in registry therewith, rotary means for delivering closures successively to said magnetic devices, means for directing steam between the closures and the corresponding containers during a substantial part of their continuous movement in said arcuate path and until prevented by the sealing operation, and means for forcing said magnetic devices downwardly successively to seal the closures onto the containers while continuing said directing of steam, thereby to displace air and trap steam in the head space thereof to form vacuums therein during the continued movement of the containers and closures in said arcuate path.

29. In a sealing machine of the class described, the combination of a turret mounted to rotate about the vertical axis of the sealing machine, means for continuously rotating said turret, means for continuously moving containers in an arcuate path about said vertical axis, a plurality of devices on the turret for picking up closures successively and supporting closures above and independently of the moving containers and in registry therewith, rotary means for delivering closures successively to said pickup devices, means for delivering closures successively to said rotary means, means for directing steam between the closures and the corresponding containers during a substantial part of their continuous movement in said arcuate path and until prevented by the sealing operation, and means for relatively moving said pickup devices and said containers vertically to seal the closures onto the containers while continuing their movement and while continuing said directing of steam, thereby to displace air and trap steam in the head spaces thereof to form vacuums therein during the continued movement of the containers and closures in said arcuate path.

30. In a sealing machine of the class described, the combination of means for continuously moving containers at a substantially constant speed in an arcuate path about the vertical axis of the sealing machine, devices for picking up a plurality of closures simultaneously and supporting them independently of and in registry with a plurality of moving containers, respectively, means for delivering closures to said pickup devices, means for supplying steam to the space between the closures and the corresponding containers during a substantial part of their continuous movement in said arcuate path and until prevented by the sealing operation, and means for forcing said pickup devices downwardly to seal a plurality of closures onto containers simultaneously while continuing said supplying of steam to displace air and trap steam in the head spaces thereof to form vacuums therein during the continued movement of the containers and closures in said arcuate path about the vertical axis of the sealing machine.

FREDERICK Z. FOUSE.

REFERENCES CITED

The following references are of record in the file of this patent:

UNITED STATES PATENTS

| Number | Name | Date |
|---|---|---|
| 735,978 | Hodgson | Aug. 11, 1903 |
| 1,024,493 | Baroody | Apr. 30, 1912 |
| 1,078,607 | Calleson | Nov. 18, 1913 |
| 1,083,768 | Stone | Jan. 6, 1914 |
| 1,141,165 | Winter | June 1, 1915 |
| 1,309,935 | Calleson | July 15, 1919 |
| 1,355,184 | Taliaferro et al. | Oct. 12, 1920 |
| 1,403,879 | Taliaferro | Jan. 17, 1922 |
| 1,407,104 | Walker | Feb. 21, 1922 |
| 1,641,480 | Fleischer | Sept. 6, 1927 |
| 1,649,266 | Tevander | Nov. 15, 1927 |
| 1,697,201 | Muller | Jan. 1, 1929 |
| 1,722,420 | Horton | July 30, 1929 |
| 1,775,255 | Risser | Sept. 9, 1930 |
| 1,817,373 | Hopkins | Aug. 4, 1931 |
| 1,964,078 | Podel | Jan. 26, 1934 |
| 1,978,095 | Spahn | Oct. 23, 1934 |
| 2,024,846 | Burgess et al. | Dec. 17, 1935 |
| 2,025,061 | Kronquest | Dec. 24, 1935 |
| 2,039,338 | Nordquist | May 5, 1936 |
| 2,126,942 | Barnby | Aug. 16, 1938 |
| 2,176,448 | Ayars | Oct. 17, 1939 |
| 2,184,117 | Fechheimer | Dec. 19, 1939 |
| 2,235,583 | Kronquest et al. | Mar. 18, 1941 |
| 2,241,455 | Gantzer | May 13, 1941 |
| 2,295,692 | Safranski et al. | Sept. 15, 1942 |
| 2,298,386 | Jennings | Oct. 13, 1942 |
| 2,304,437 | Bell | Dec. 8, 1942 |
| 2,309,929 | Bronson | Feb. 2, 1943 |
| 2,309,548 | Stover | Jan. 26, 1943 |
| 2,329,776 | Mondloch | Sept. 21, 1943 |
| 2,362,841 | Minaker | Nov. 14, 1944 |

Certificate of Correction

Patent No. 2,510,568                                                    June 6, 1950

FREDERICK Z. FOUSE

It is hereby certified that error appears in the printed specification of the above numbered patent requiring correction as follows:

Column 3, line 7, for "specer" read *spacer*; column 7, line 27, for "the bearing" read *a bearing*; line 29, for "a hub" read *the hub*; column 9, line 34, after the word "container" insert a period; column 15, line 70, before "suitable" insert *a*; column 16, line 69, for the indistinct word before "feed" read *cap*; column 25, line 7, before "star" insert *the*; column 27, line 52, for "rotatably" read *rotatable*; column 29, lines 54 and 64, before "head" insert *a*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*